US012664932B2

(12) United States Patent
Ren et al.

(10) Patent No.: US 12,664,932 B2
(45) Date of Patent: Jun. 23, 2026

(54) TRIGGER CIRCUIT AND PIXEL DRIVING CIRCUIT

(71) Applicant: BOE Technology Group Co., Ltd., Beijing (CN)

(72) Inventors: Jinyu Ren, Beijing (CN); Fangzhen Zhang, Beijing (CN); Xinxing Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/993,533

(22) PCT Filed: Apr. 17, 2024

(86) PCT No.: PCT/CN2024/088249
§ 371 (c)(1),
(2) Date: Jan. 11, 2025

(87) PCT Pub. No.: WO2024/244758
PCT Pub. Date: Dec. 5, 2024

(65) Prior Publication Data

US 2026/0024483 A1 Jan. 22, 2026

(30) Foreign Application Priority Data

May 31, 2023 (CN) ........................ 202310635799.0

(51) Int. Cl.
*G09G 3/32* (2016.01)
*G09G 3/3233* (2016.01)

(52) U.S. Cl.
CPC ............ *G09G 3/32* (2013.01); *G09G 3/3233* (2013.01); *G09G 2300/0819* (2013.01); *G09G 2320/064* (2013.01)

(58) Field of Classification Search
CPC .................. G09G 3/32; G09G 3/3233; G09G 2300/0819; G09G 2320/064
See application file for complete search history.

(56) References Cited

U.S. PATENT DOCUMENTS 10,504,406 B2 * 12/2019 Shigeta ................ G09G 3/2081
11,538,404 B2 * 12/2022 Han ......................... G09G 3/32
(Continued)

FOREIGN PATENT DOCUMENTS

CN 102571046 A 7/2012
CN 111477162 A 7/2020
(Continued)

OTHER PUBLICATIONS

Wang et al., A New PWM Pixel Circuit for Micro-LED Displaly with 60Hz Driving and 120Hz Lighting, Symposium Article, SID 2020 Digest, Sep. 2020, pp. 1707-1710.

*Primary Examiner* — Mihir K Rayan
(74) *Attorney, Agent, or Firm* — HOUTTEMAN LAW LLC

(57) ABSTRACT

A trigger circuit includes: an input sub-circuit, a reset sub-circuit, a control sub-circuit, a duty cycle adjustment sub-circuit and an output sub-circuit. The input sub-circuit controls a signal output terminal of the output sub-circuit to output a first power voltage or a second power voltage in response to an input control signal; the reset sub-circuit resets, in response to a reset signal, a first node through the reset signal, the first node being a connection node between the control sub-circuit and the duty cycle adjustment sub-circuit; the control sub-circuit controls a potential at the first node in response to a data voltage control signal; the duty cycle adjustment sub-circuit adjusts a duty cycle of a clock signal output from the signal output terminal in response to the potential at the first node, a potential of the clock signal (Continued)

jumps between the first power voltage and the second power voltage.

14 Claims, 11 Drawing Sheets

(56) References Cited

U.S. PATENT DOCUMENTS

| | | | | |
|---|---|---|---|---|
| 11,783,766 | B1 * | 10/2023 | Li | G09G 3/32 345/55 |
| 2007/0024379 | A1 * | 2/2007 | Greenberg | H03B 5/1265 331/16 |
| 2013/0044854 | A1 | 2/2013 | Yonemaru et al. | |
| 2016/0232848 | A1 * | 8/2016 | Meng | G09G 3/3258 |
| 2025/0078730 | A1 * | 3/2025 | Lee | G09G 3/34 |

FOREIGN PATENT DOCUMENTS

| | | | | | |
|---|---|---|---|---|---|
| CN | 113053319 | A | | 6/2021 | |
| CN | 114333685 | A | | 4/2022 | |
| CN | 115083336 | A | * | 6/2022 | G09G 3/32 |
| CN | 115620664 | A | | 1/2023 | |
| CN | 115731841 | A | | 3/2023 | |
| CN | 116364002 | A | | 6/2023 | |

* cited by examiner

TRIGGER CIRCUIT AND PIXEL DRIVING CIRCUIT

CROSS-REFERENCE TO RELATED APPLICATIONS

The present disclosure is a National Phase Application filed under 35 U.S.C. 371 as a national stage of PCT/CN2024/088249 filed on Apr. 17, 2024, the content of which is incorporated herein in their entirety by reference.

TECHNICAL FIELD

The present disclosure relates to the field of circuit technology, and particularly relates to a trigger circuit and a pixel driving circuit.

BACKGROUND

A PAM (Pulse Amplitude Modulation) driving mode is a main driving mode for a gray scale of a current display product. With the continuous development of a series of display technologies such as LCD (Liquid Crystal Display), OLED (Organic Light Emitting Diode), LED (Light Emitting Diode), QD (Quantum Dot), disadvantages, such as having a high driving power consumption, generating a great amount of heat, incapable of realizing the low gray scale display, of the PAM driving mode are more and more prominent. Therefore, a PWM (Pulse Width Modulation) driving mode for a gray scale is introduced on the basis of the PAM driving mode for solving such problems. The introduction of the PWM driving mode greatly increases the complexity of a driving circuit, which obstructs the development of advanced technologies, such as a high PPI (Pixels Per Inch), and a narrow bezel. In addition, the complex processes may reduce the yield and further increase the cost. The existing PWM driving mode has a low driving frequency, which stings eyes to some extent. Therefore, it is necessary to further improve the current PWM driving mode, in order to achieve a healthy display. The current PWM driving mode is a full-screen driving mode, or a timing signal with a fixed duty cycle, which is introduced into a pixel driving circuit, is combined with the PAM driving mode to realize the low gray scale display. These two circuit designs increase the complexity of the driving circuit, and do not solve the problems of having a high power consumption, and generating a great amount of heat. In view of the above problems, it is urgently needed to develop a new driving circuit for a gray scale, to follow the development of the display technology.

SUMMARY

The present disclosure is directed to at least one of the technical problems in the related art, and provides a trigger circuit and a pixel driving circuit.

In a first aspect, an embodiment of the present disclosure provides a trigger circuit, including: an input sub-circuit, a reset sub-circuit, a control sub-circuit, a duty cycle adjustment sub-circuit and an output sub-circuit, wherein, the input sub-circuit is configured to control a signal output terminal of the output sub-circuit to output a first power voltage or output a second power voltage in response to an input control signal;

the reset sub-circuit is configured to reset, in response to a reset signal, a first node through the reset signal, and the first node is a connection node between the control sub-circuit and the duty cycle adjustment sub-circuit;

the control sub-circuit is configured to control a potential at the first node in response to a data voltage control signal; and the duty cycle adjustment sub-circuit is configured to adjust a duty cycle of a clock signal output from the signal output terminal of the output sub-circuit in response to the potential at the first node, and a potential of the clock signal jumps (switches) between the first power voltage and the second power voltage.

In some implementations, the input sub-circuit includes a first transistor, wherein a first electrode of the first transistor is connected with the second power voltage terminal, a second electrode of the first transistor is connected with the output sub-circuit, and a control electrode of the first transistor is connected with an input control signal terminal.

In some implementations, the reset sub-circuit includes a second transistor; a switching characteristic of the second transistor is opposite to a switching characteristic of the first transistor;

a first electrode of the second transistor is connected with the first node, and a second electrode of the second transistor is connected with a control electrode of the second transistor and a reset signal terminal.

In some implementations, the duty cycle adjustment sub-circuit includes a third transistor, a first capacitor, and a second capacitor; the switching characteristic of the third transistor is the same as the switching characteristic of the first transistor;

a first electrode of the third transistor is connected with a first power voltage terminal, a second electrode of the third transistor is connected with the output sub-circuit and a first terminal of the first capacitor, and a control electrode of the third transistor is connected with the first node and a first terminal of the second capacitor; and a second terminal of the first capacitor and a second terminal of the second capacitor are both connected with the second power voltage terminal.

In some implementations, the control sub-circuit includes a fourth transistor and a fifth transistor; a switching characteristic of the fourth transistor and a switching characteristic of the fifth transistor are both opposite to the switching characteristic of the third transistor;

a first electrode of the fourth transistor is connected with the first node, a second electrode of the fourth transistor is connected with a second electrode of the fifth transistor, and a control electrode of the fourth transistor is connected with the signal output terminal of the output sub-circuit; and a first electrode of the fifth transistor is connected with the second power voltage terminal, and a control electrode of the fifth transistor is connected with a data voltage control terminal.

In some implementations, the control sub-circuit includes a fifth transistor having a switching characteristic opposite to the switching characteristic of the third transistor;

a first electrode of the fifth transistor is connected to the second power voltage terminal, a second electrode of the fifth transistor is connected to the first node, and a control electrode of the fifth transistor is connected to a data voltage control terminal.

In some implementations, the input sub-circuit includes a first transistor; a first electrode of the first transistor is connected with a first power voltage terminal, a second electrode of the first transistor is connected with the output sub-circuit, and a control electrode of the first transistor is connected with an input control signal terminal.

In some implementations, the reset sub-circuit includes a second transistor; a switching characteristic of the second transistor is opposite to a switching characteristic of the first transistor; and a first electrode of the second transistor is connected with the first node, and a second electrode of the second transistor is connected with a control electrode of the second transistor and a reset signal terminal.

In some implementations, the duty cycle adjustment sub-circuit includes a third transistor, a first capacitor, and a second capacitor; a switching characteristic of the third transistor is the same as the switching characteristic of the first transistor; a first electrode of the third transistor is connected with a second power voltage terminal, and a second electrode of the third transistor is connected with the output sub-circuit and a first terminal of the first capacitor; a control electrode of the third transistor is connected with the first node and a first terminal of the second capacitor; and a second terminal of the first capacitor and a second terminal of the second capacitor are both connected with the first power voltage terminal.

In some implementations, the control sub-circuit includes a fourth transistor and a fifth transistor; a switching characteristic of the fourth transistor is the same as the switching characteristic of the third transistor, and a switching characteristic of the fifth transistor is opposite to the switching characteristic of the third transistor;

a first electrode of the fourth transistor is connected with the first node, a second electrode of the fourth transistor is connected with a second electrode of the fifth transistor, and a control electrode of the fourth transistor is connected with the signal output terminal of the output sub-circuit; and a first electrode of the fifth transistor is connected with the first power voltage terminal, and a control electrode of the fifth transistor is connected with a data voltage control terminal.

In some implementations, the control sub-circuit includes a fifth transistor having a switching characteristic opposite to the switching characteristic of the third transistor;

a first electrode of the fifth transistor is connected to the first power voltage terminal, a second electrode of the fifth transistor is connected to the first node, and a control electrode of the fifth transistor is connected to a data voltage control terminal.

In some implementations, the output sub-circuit includes a sixth transistor and a seventh transistor; a switching characteristic of the sixth transistor is opposite to a switching characteristic of the seventh transistor;

a first electrode of the sixth transistor is connected with a first power voltage terminal, a second electrode of the sixth transistor is connected with the signal output terminal of the output sub-circuit, and a control electrode of the sixth transistor is connected with a control electrode of the seventh transistor, the input sub-circuit and the duty cycle adjustment sub-circuit; and a first electrode of the seventh transistor is connected with a second power voltage terminal, and a second electrode of the seventh transistor is connected with the signal output terminal of the output sub-circuit.

An embodiment of the present disclosure further provides a trigger circuit, which includes: an input sub-circuit, a reset sub-circuit, a control sub-circuit and a duty cycle adjustment sub-circuit, wherein, the input sub-circuit is configured to control a signal output terminal to output a first power voltage or output a second power voltage in response to an input control signal; the signal output terminal is a connection node between the input sub-circuit and the duty cycle adjustment sub-circuit;

the reset sub-circuit is configured to reset, in response to a reset signal, a first node through the reset signal, the first node is a connection node between the control sub-circuit and the duty cycle adjustment sub-circuit;

the control sub-circuit is configured to control a potential at the first node in response to a data voltage control signal, an output signal of the signal output terminal, and the reset signal;

the duty cycle adjustment sub-circuit is configured to adjust a duty cycle of a clock signal output from the signal output terminal in response to the potential at the first node, a potential of the clock signal jumps between the first power voltage and the second power voltage.

In some implementations, the input sub-circuit includes a first transistor, a first electrode of the first transistor is connected with a second power voltage terminal, a second electrode of the first transistor is connected with the signal output terminal, and a control electrode of the first transistor is connected with an input control signal terminal.

In some implementations, the reset sub-circuit includes a second transistor, a switching characteristic of the second transistor is opposite to a switching characteristic of the first transistor;

a first electrode of the second transistor is connected with the first node, and a second electrode of the second transistor is connected with a control electrode of the second transistor and a reset signal terminal.

In some implementations, the duty cycle adjustment sub-circuit includes a third transistor, a first capacitor, and a second capacitor, a switching characteristic of the third transistor is the same as the switching characteristic of the first transistor; a first electrode of the third transistor is connected with a first power voltage terminal, and a second electrode of the third transistor is connected with the signal output terminal and a first terminal of the first capacitor; a control electrode of the third transistor is connected with the first node and a first terminal of the second capacitor; and a second terminal of the first capacitor and a second terminal of the second capacitor are both connected with a second power voltage terminal.

In some implementations, the control sub-circuit includes a fourth transistor, a fifth transistor, and a sixth transistor; a switching characteristic of the fourth transistor is the same as the switching characteristic of the third transistor, and a switching characteristic of the fifth transistor and a switching characteristic of the sixth transistor are both opposite to the switching characteristic of the third transistor;

a first electrode of the fourth transistor is connected with a second electrode of the fifth transistor and a first electrode of the sixth transistor, a second electrode of the fourth transistor is connected with the first node, and a control electrode of the fourth transistor is connected with a reset signal terminal;

a first electrode of the fifth transistor is connected with a first electrode of the sixth transistor and the second power voltage terminal, and a control electrode of the fifth transistor is connected with a data voltage control terminal; and a control electrode of the sixth transistor is connected with the signal output terminal.

In some implementations, the input sub-circuit includes a first transistor, a first electrode of the first transistor is connected with a first power voltage terminal, a second electrode of the first transistor is connected with the signal output terminal, and a control electrode of the first transistor is connected with an input control signal terminal.

In some implementations, the reset sub-circuit includes a second transistor, a switching characteristic of the second transistor is opposite to a switching characteristic of the first transistor; and wherein a first electrode of the second transistor is connected with the first node, and a second electrode of the second transistor is connected with a control electrode of the second transistor and a reset signal terminal.

In some implementations, the duty cycle adjustment sub-circuit includes a third transistor, a first capacitor, and a second capacitor; a switching characteristic of the third transistor is the same as a switching characteristic of the first transistor; a first electrode of the third transistor is connected with a second power voltage terminal, and a second electrode of the third transistor is connected with the signal output terminal and a first terminal of the first capacitor; a control electrode of the third transistor is connected with the first node and a first terminal of the second capacitor; and a second terminal of the first capacitor and a second terminal of the second capacitor are both connected with the first power voltage terminal.

In some implementations, the control sub-circuit includes a fourth transistor, a fifth transistor, and a sixth transistor; a switching characteristic of the fourth transistor is the same as the switching characteristic of the third transistor, and a switching characteristic of the fifth transistor and a switching characteristic of the sixth transistor are both opposite to the switching characteristic of the third transistor;

a first electrode of the fourth transistor is connected with a second electrode of the fifth transistor and a first electrode of the sixth transistor, a second electrode of the fourth transistor is connected with the first node, and a control electrode of the fourth transistor is connected with a reset signal terminal; and a first electrode of the fifth transistor is connected with a first electrode of the sixth transistor and the first power voltage terminal, and a control electrode of the fifth transistor is connected with a data voltage control terminal; and a control electrode of the sixth transistor is connected with the signal output terminal.

In a second aspect, an embodiment of the present disclosure provides a pixel driving circuit, including: a driving transistor and the trigger circuit of any one of the above embodiments; the output terminal of the trigger circuit is connected to a control electrode of the driving transistor.

DETAIL DESCRIPTION OF EMBODIMENTS

Figure 1:
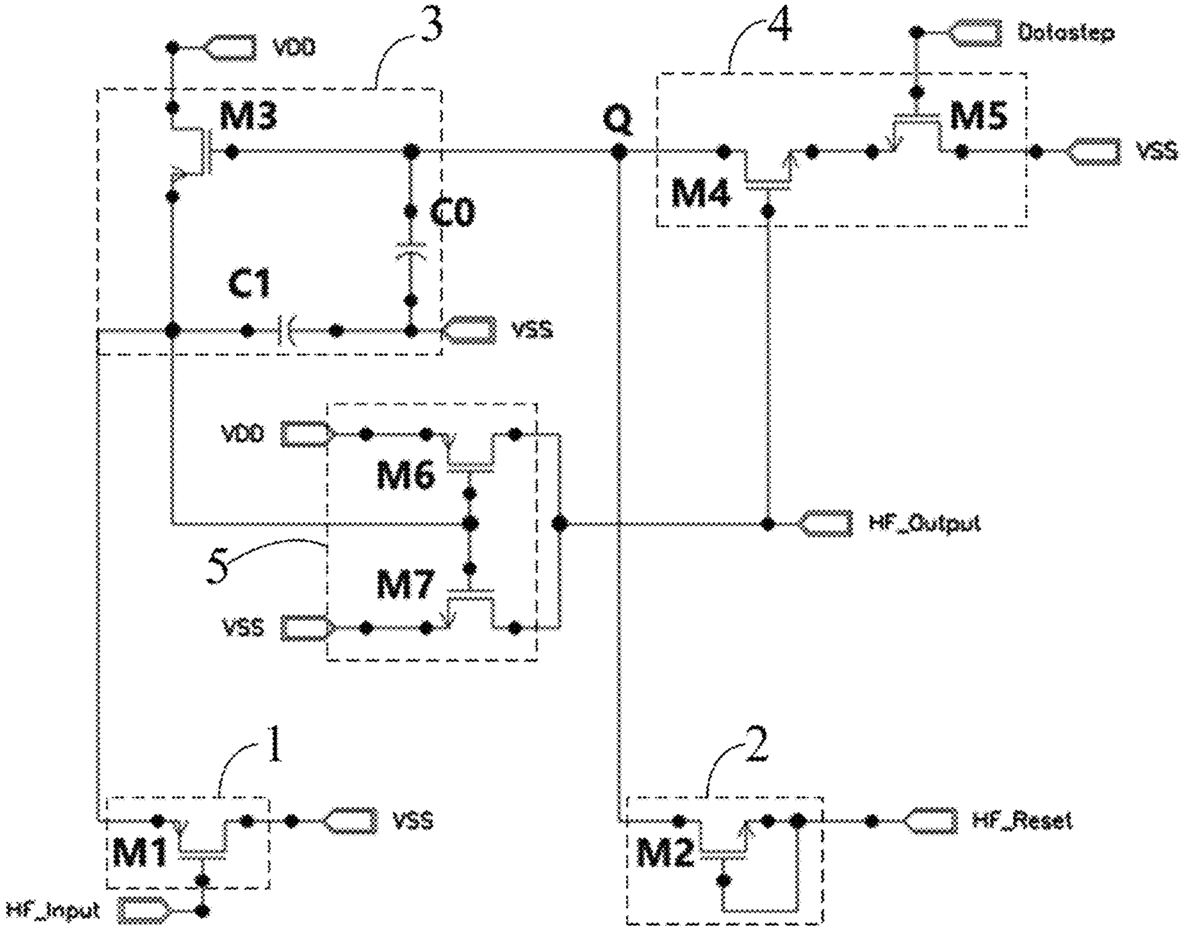
FIG. 1 is a schematic diagram of a trigger circuit in a first example of an embodiment of the present disclosure.

In order to enable one of ordinary skill in the art to better understand the technical solutions of the present disclosure, the present disclosure will be described in further detail with reference to the accompanying drawings and the detailed description.

Unless defined otherwise, technical or scientific terms used herein shall have the ordinary meaning as understood by one of ordinary skill in the art to which the present disclosure belongs. The terms “first”, “second”, and the like used in the present disclosure are not intended to indicate any order, quantity, or importance, but rather are used for distinguishing one element from another. Further, the term “a”, “an”, “the”, or the like used herein does not denote a limitation of quantity, but rather denotes the presence of at least one element. The term “comprising”, “including”, or the like means that the element or item preceding the term contains the element or item listed after the term and its equivalent, but does not exclude other elements or items. The term “connected”, “coupled”, or the like is not limited to physical or mechanical connections, but may include electrical connections, whether direct or indirect connections. The terms “upper”, “lower”, “left”, “right”, and the like are used only for indicating relative positional relationships, and when the absolute position of an object being described is changed, the relative positional relationships may also be changed accordingly.

Before describing the embodiments of the present disclosure, it should be noted that in the embodiments of the present disclosure, (a magnitude of) a first power supply voltage is greater than (a magnitude of) a second power supply voltage. For example: (a magnitude of) the first power supply voltage is 8V and (a magnitude of) the second power supply voltage is −8V. That is, the first power supply voltage is a high-level signal with respect to the second power supply voltage, and the second power supply voltage is a low-level signal with respect to the first power supply voltage. However, a first power supply voltage terminal and a second power supply voltage terminal in the embodiments described below are configured to provide the first power supply voltage and the second power supply voltage, respectively. An input control signal and a reset signal in the embodiments described below are both high frequency scan signals.

In a first aspect, an embodiment of the present disclosure provides a trigger circuit having a duty cycle adjustment function, where the trigger circuit includes: an input sub-circuit, a reset sub-circuit, a control sub-circuit, a duty cycle adjustment sub-circuit and an output sub-circuit. The input sub-circuit is configured to control a signal output terminal of the output sub-circuit to output a first power voltage or output a second power voltage in response to an input control signal. The reset sub-circuit is configured to reset, in response to a reset signal, a first node through the reset signal. The first node is a connection node between the control sub-circuit and the duty cycle adjustment sub-circuit. The control sub-circuit is configured to control a potential at the first node in response to a data voltage control signal. The duty cycle adjustment sub-circuit is configured to adjust a duty cycle of a clock signal output from the signal output terminal of the output sub-circuit in response to the potential at the first node. A potential of the clock signal jumps between the first power voltage and the second power voltage.

The trigger circuit provided by the embodiment of the present disclosure is provided with the duty cycle adjustment sub-circuit, which may generate the clock signal with the adjustable duty cycle. In this case, the trigger circuit may be applied to the pixel driving circuit, and a turn-on time of a driving transistor is controlled based on the clock signal generated by the trigger circuit, thereby controlling a brightness of a light emitting device.

In order to make the trigger circuit in the embodiment of the present disclosure clearer, the trigger circuit in the embodiment of the present disclosure is specifically described below with reference to specific examples.

A First Example

FIG. 1 is a schematic diagram of a trigger circuit in a first example of an embodiment of the present disclosure; as shown in FIG. 1, the trigger circuit includes an input sub-circuit 1, a reset sub-circuit 2, a control sub-circuit 4, a duty cycle adjustment sub-circuit 3, and an output sub-circuit 5. A connection node between the control sub-circuit 4 and the duty cycle adjustment sub-circuit 3 is a first node Q.

In this example, the input sub-circuit 1 may include a first transistor M1; the reset sub-circuit 2 may include a second transistor M2; the duty cycle adjustment sub-circuit 3 may include: a third transistor M3, a first capacitor, and a second capacitor; the control sub-circuit 4 may include a fourth transistor M4 and a fifth transistor M5; and the output sub-circuit 5 may include a sixth transistor M6 and a seventh transistor M7. The switching characteristics of the first transistor M1 and the second transistor are opposite to each other, the switching characteristics of the third transistor M3 and the sixth transistor M6 are all the same as that of the first transistor, and the switching characteristics of the fourth transistor M4, the fifth transistor M5 and the seventh transistor M7 are all the same as that of the second transistor M2.

In this example, it is exemplified that the first transistor M1, the third transistor M3, and the sixth transistor M6 all employ P-type transistors, and the second transistor M2, the fourth transistor M4, the fifth transistor M5, and the seventh transistor M7 all employ N-type transistors.

Specifically, a first electrode of the first transistor M1 is connected to a second power voltage terminal VSS, a second electrode of the first transistor M1 is connected to control electrodes of the sixth transistor M6 and the seventh transistor M7, and a control electrode of the first transistor M1 is connected to an input control signal terminal HF_Input. A first electrode of the second transistor M2 is connected to the first node Q, and a second electrode of the second transistor M2 is connected to a control electrode thereof and a reset signal terminal HF_Reset. A first electrode of the third transistor M3 is connected to a first power voltage terminal VDD, and a second electrode of the third transistor M3 is connected to a first terminal of the first capacitor and the control electrodes of the sixth transistor M6 and the seventh transistor M7; a control electrode of the third transistor M3 is connected to the first node Q and a first terminal of the second capacitor; a second terminal of the first capacitor and a second terminal of the second capacitor are both connected with the second power voltage terminal VSS. A first electrode of the fourth transistor M4 is connected to the first node Q, a second electrode of the fourth transistor M4 is connected to a second electrode of the fifth transistor M5, and a control electrode of the fourth transistor M4 is connected to a signal output terminal HF_Output; a first electrode of the fifth transistor M5 is connected to the second power voltage terminal VSS, and a control electrode of the fifth transistor M5 is connected to a data voltage control terminal. A first electrode of the sixth transistor M6 is connected to the first power voltage terminal VDD, and a second electrode of the sixth transistor M6 is connected to the signal output terminal HF_Output. A first electrode of the seventh transistor M7 is connected to the second power voltage terminal VSS, and a second electrode of the seventh transistor M7 is connected to the signal output terminal HF_Output.

The trigger circuit will be specifically described below with reference to a method for generating a clock signal by the trigger circuit in the above example.

The trigger circuit in the first example is simulated by taking an example where: the first power voltage is 8V, and the second power voltage is −8V; in a time sequence of an input control signal, a high-level signal is at 12V, a low-level signal is at −12V, a period of the input control signal is denoted by H, and H=100 μs, and a duty cycle of the input control signal is equal to a duration of the low-level signal/a duration of the high-level signal, which is equal to 0.1 μs/99.9 μs; in the time sequence of the reset signal, the high-level signal is at 20V, the low-level signal is at −12V, a period of the reset signal is also denoted by H, and H=100 μs, and a duty cycle of the reset signal is equal to a duration of the low-level signal/a duration of the high-level signal, which is equal to 99.9 μs/0.1 μs; a voltage of a data voltage control signal Datastep may be respectively selected as −7.45V, −7.4V, −7.3V, −7.2V, −7.1V, −7V, −6.9V, −6.8V, and −6.7V (that is, Datastep=[−7.45V, −7.4V, −7.3V, −7.2V, −7.1V, −7V, −6.9V, −6.8V, −6.7V]), a capacitance of the first capacitor C1 is 50 fF and a capacitance of the second capacitor C2 is 2 pF. It should be understood that the above parameters can be adjusted according to actual requirements in use of an actual product.

Next, the method for generating a clock signal by the trigger circuit will be described. The method specifically includes the following first stage to fourth stage.

In a first stage, that is, in a beginning stage of a clock cycle, the reset signal, which is a high-level signal, is written into the reset signal terminal HF_Reset, so that the second transistor M2 is turned on, a potential at the first node Q is reset to 20V, and therefore, the third transistor M3 is turned off.

In a second stage, the reset signal, which is a low-level signal, is written into the reset signal terminal HF_Reset, so that the second transistor M2 is turned off; the input control signal, which is a low-level signal, is written into the input control signal terminal HF_Input, so that the first transistor M1 is turned on, at this time, the second power voltage is written into the first capacitor, the sixth transistor M6 is turned on, the seventh transistor M7 is turned off, and the signal output terminal HF_Output outputs the first power voltage, that is, outputs a high-level signal. At the same time, the fourth transistor M4 is turned on, so that the first node Q is discharged to the second power voltage terminal VSS; the data voltage control signal Datastep written by a data voltage control signal terminal Datastep is written to the control electrode of the fifth transistor M5, and a discharging speed of the first node Q is controlled by controlling a magnitude of a saturation current Id of the fifth transistor M5.

In a third stage, after the time period t elapses, the control electrode of the third transistor M3 is discharged until the potential at the first node Q minus the first power voltage is less than a threshold voltage of the third transistor M3, that is, VQ−VDD<Vth, at this time, the third transistor M3 is turned on, the first power voltage is written into the first capacitor, the sixth transistor M6 is turned off, the seventh transistor M7 is turned on, the signal output terminal HF_Output outputs the second power voltage, that is, outputs a low-level signal, and at the same time, the fourth transistor M4 is turned off, and the first node Q stops discharging.

In a fourth stage, the reset signal at the reset signal terminal HF_Reset is a low-level signal, the potential of the first node Q is reset to be 20V, in this stage, the third transistor M3 is turned off, the second power voltage is written into the first capacitor, so that the sixth transistor M6 is turned on, the seventh transistor M7 is turned off, and the signal output terminal HF_Output continuously outputs the low-level signal.

In the next cycle, the second stage to the fourth stage are repeated.

It can be seen that the data voltage control signal Datastep is written into the control electrode of the fifth transistor M5, and the discharging speed of the first node Q is controlled by controlling the magnitude of the saturation current Id of the fifth transistor M5, and the time period t required for the first node Q to discharge until VQ−VDD<Vth is met is a duration of the high-level signal in the clock cycle of the output clock signal. By adjusting a magnitude of the voltage of the data voltage control signal Datastep, output clock signals with different duty cycles can be obtained.

A Second Example

Figure 2:
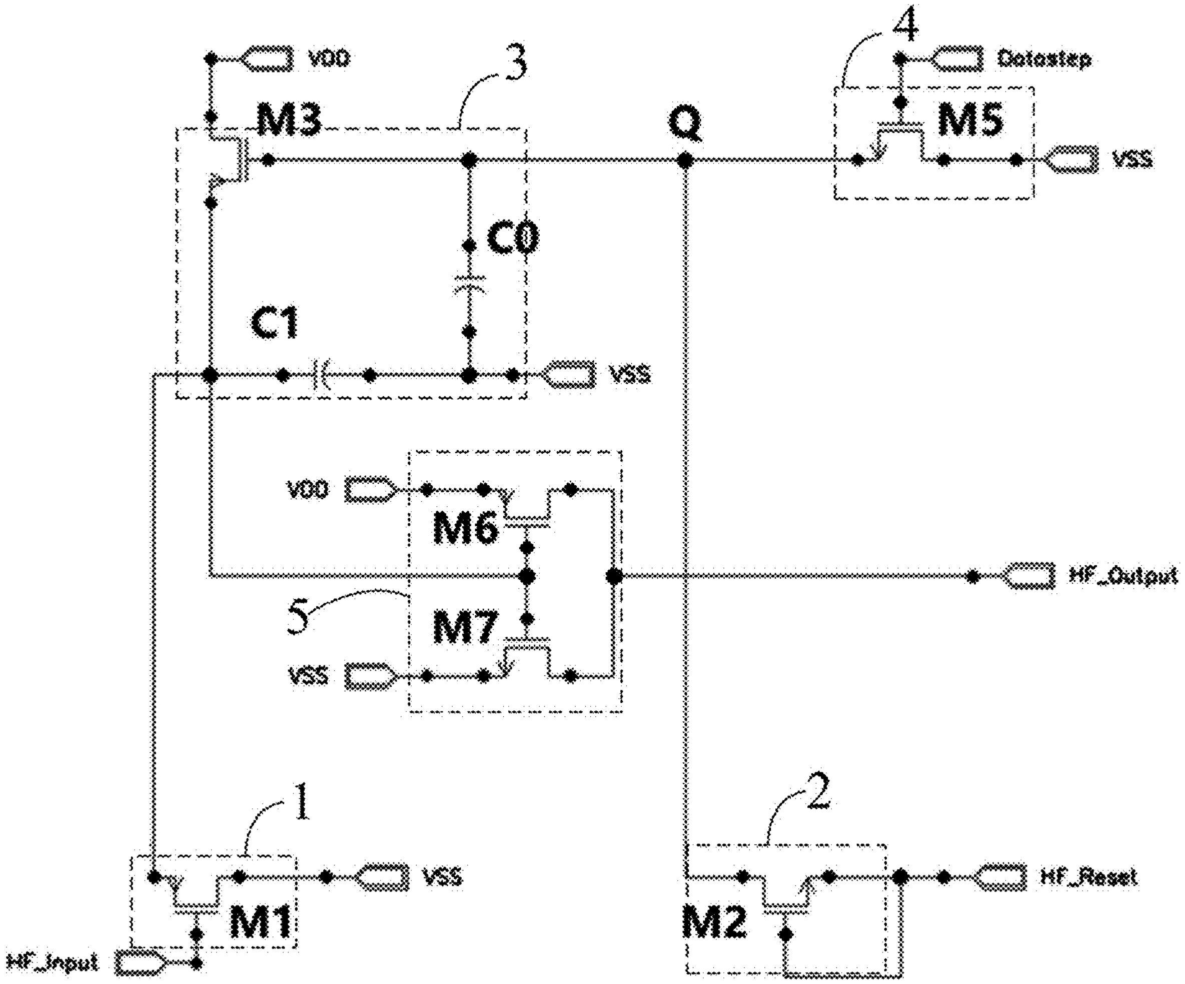
FIG. 2 is a schematic diagram of a trigger circuit in a second example of an embodiment of the present disclosure.

FIG. 2 is a schematic diagram of a trigger circuit in a second example of an embodiment of the present disclosure; as shown in FIG. 2, the trigger circuit includes an input sub-circuit 1, a reset sub-circuit 2, a control sub-circuit 4, a duty cycle adjustment sub-circuit 3, and an output sub-circuit 5. A connection node between the control sub-circuit 4 and the duty cycle adjustment sub-circuit 3 is a first node Q.

In this example, the input sub-circuit 1 may include a first transistor M1; the reset sub-circuit 2 may include a second transistor M2; the duty cycle adjustment sub-circuit 3 may include a third transistor M3, a first capacitor, and a second capacitor; the control sub-circuit 4 may include a fifth transistor M5, and the output sub-circuit 5 may include a sixth transistor M6 and a seventh transistor M7. The switching characteristics of the first transistor M1 and the second transistor are opposite to each other, the switching characteristics of the third transistor M3 and the sixth transistor M6 are both the same as the switching characteristic of the first transistor, and the switching characteristics of the fifth transistor M5 and the seventh transistor M7 are both the same as the switching characteristic of the second transistor M2.

In this example, it is exemplified that the first transistor M1, the third transistor M3, and the sixth transistor M6 all employ P-type transistors, and the second transistor M2, the fifth transistor M5, and the seventh transistor M7 all employ N-type transistors.

Specifically, a first electrode of the first transistor M1 is connected to a second power voltage terminal VSS, a second electrode of the first transistor M1 is connected to control electrodes of the sixth transistor M6 and the seventh transistor M7, and a control electrode of the first transistor M1 is connected to an input control signal terminal HF_Input. A first electrode of the second transistor M2 is connected to the first node Q, and a second electrode of the second transistor M2 is connected to a control electrode thereof and a reset signal terminal HF_Reset. A first electrode of the third transistor M3 is connected to a first power voltage terminal VDD, and a second electrode of the third transistor M3 is connected to a first terminal of the first capacitor and the control electrodes of the sixth transistor M6 and the seventh transistor M7; a control electrode of the third transistor M3 is connected to the first node Q and a first terminal of the second capacitor; a second terminal of the first capacitor and a second terminal of the second capacitor are both connected with the second power voltage terminal VSS. A first electrode of the fifth transistor M5 is connected to the second power voltage terminal VSS, and a control electrode of the fifth transistor M5 is connected to a data voltage control terminal. A first electrode of the sixth transistor M6 is connected to the first power voltage terminal VDD, and a second electrode of the sixth transistor M6 is connected to a signal output terminal HF_Output. A first electrode of the seventh transistor M7 is connected to the second power voltage terminal VSS, and a second electrode of the seventh transistor M7 is connected to the signal output terminal HF_Output.

The trigger circuit will be specifically described below with reference to a method for generating a clock signal by the trigger circuit in the above example.

The trigger circuit in the second example is simulated by taking an example where: the first power voltage is 8V, and the second power voltage is −8V; in a time sequence of an input control signal, the high-level signal is at 12V, the low-level signal is at −12V, a period of the input control signal is denoted by H, and H=100 μs, and a duty cycle of the input control signal is equal to a duration of the low-level signal/a duration of the high-level signal, which is equal to 0.1 μs/99.9 μs; in a time sequence of a reset signal, the high-level signal is at 20V, the low-level signal is at −12V, a period of the reset signal is also denoted by H, and H=100 μs, and a duty cycle of the reset signal is equal to a duration of the low-level signal/a duration of the high-level signal, which is equal to 99.9 μs/0.1 μs; a voltage of a data voltage control signal Datastep may be respectively selected to be −7.45V, −7.4V, −7.3V, −7.2V, −7.1V, −7V, −6.9V, −6.8V, and −6.7V (that is, Datastep=[−7.45V, −7.4V, −7.3V, −7.2V, −7.1V, −7V, −6.9V, −6.8V, −6.7V], a capacitance of the first capacitor is 50 fF and a capacitance of the second capacitance is 2 pF. It should be understood that the above parameters can be adjusted according to actual requirements in use of an actual product.

Next, the method for generating a clock signal by the trigger circuit will be described. The method specifically includes the following first stage to fourth stage.

In a first stage, that is, in a beginning stage of a clock cycle, the reset signal, which is a high-level signal, is written into the reset signal terminal HF_Reset, so that the second transistor M2 is turned on, a potential at the first node Q is reset to 20V, and therefore, the third transistor M3 is turned off.

In a second stage, the reset signal, which is a low-level signal, is written into the reset signal terminal HF_Reset, so that the second transistor M2 is turned off; the input control signal, which is a low-level signal, is written into the input control signal terminal HF_Input, so that the first transistor M1 is turned on, at this time, the second power voltage is written into the first capacitor, the sixth transistor M6 is turned on, the seventh transistor M7 is turned off, and the signal output terminal HF_Output outputs the first power voltage, that is, outputs a high-level signal. At the same time, the data voltage control signal Datastep written by a data voltage control signal terminal Datastep is written to the control electrode of the fifth transistor M5, and a discharging speed of the first node Q is controlled by controlling a magnitude of a saturation current Id of the fifth transistor M5.

In a third stage, after a time period t elapses, the control electrode of the third transistor M3 is discharged until the potential at the first node Q minus the first power voltage is less than a threshold voltage of the third transistor M3, that is, VQ−VDD<Vth, at this time, the third transistor M3 is turned on, the first power voltage is written into the first capacitor, the sixth transistor M6 is turned off, the seventh transistor M7 is turned on, and the signal output terminal HF_Output outputs the second power voltage, that is, outputs a low-level signal.

In a fourth stage, the reset signal at the reset signal terminal HF_Reset is a low-level signal, the first node Q is reset to be at 20V, in this stage, the third transistor M3 is turned off, the second power voltage is written into the first capacitor, so that the sixth transistor M6 is turned on, the seventh transistor M7 is turned off, and the signal output terminal HF_Output continuously outputs the low-level signal.

In the next cycle, the second stage to the fourth stage are repeated.

It can be seen that the data voltage control signal Datastep is written into the control electrode of the fifth transistor M5, and the discharging speed of the first node Q is controlled by controlling the magnitude of the saturation current Id of the fifth transistor M5, and the time period t required for the first node Q to discharge until VQ−VDD<Vth is met is a duration of the high-level signal in the clock cycle of the output clock signal. By adjusting a magnitude of the voltage of the data voltage control signal Datastep, output clock signals with different duty cycles can be obtained.

Simulations of the trigger circuit in each of the first example and the second example are made according to the simulation conditions described above and an aspect ratio (W/L=5/5) of the transistor.

Figure 3:
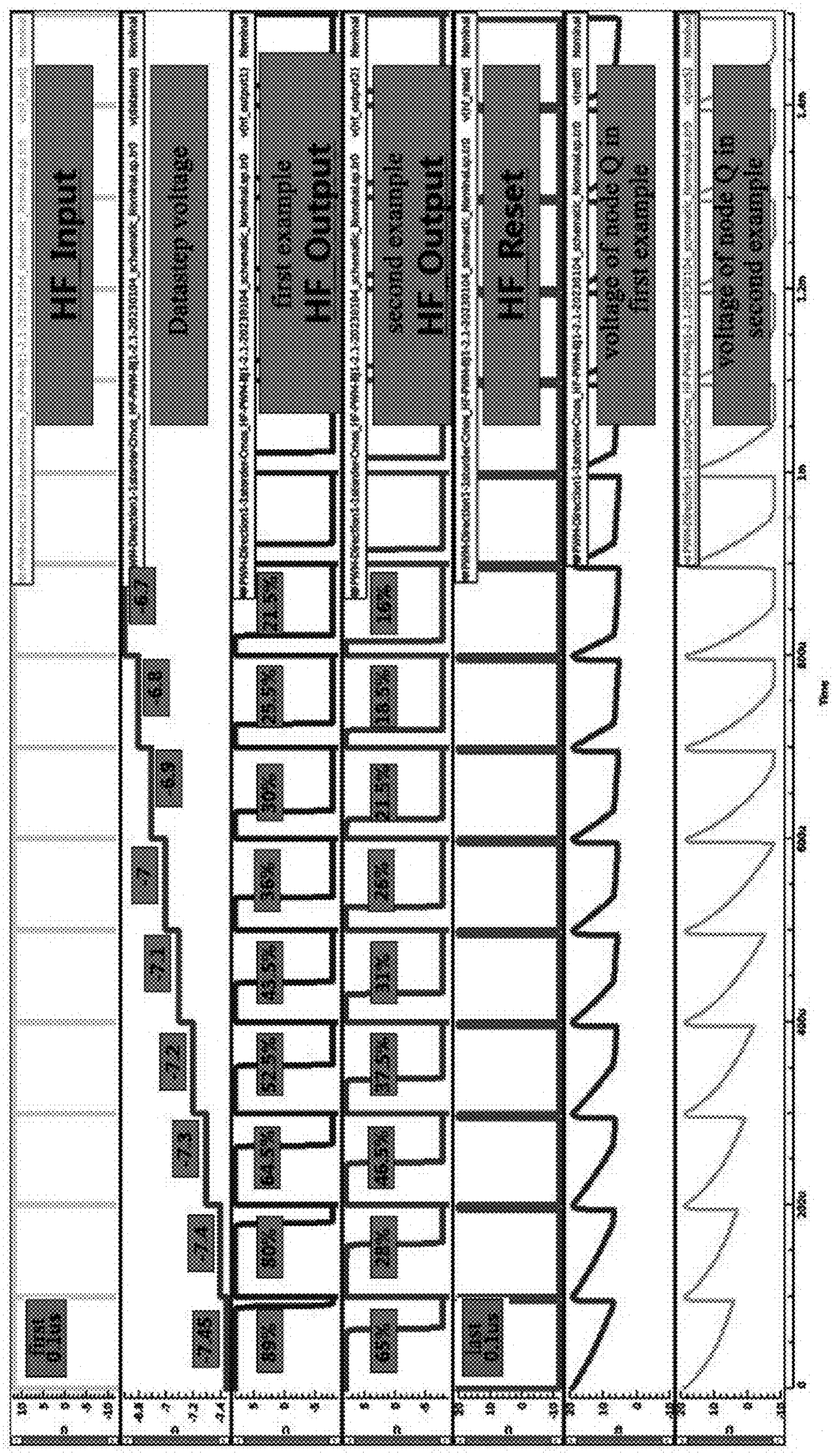
FIG. 3 is a schematic diagram showing a simulation of the trigger circuit in each of the first example and the second example of the embodiment of the present disclosure.

FIG. 3 is a schematic diagram showing a simulation of the trigger circuit in each of the first example and the second example of the embodiment of the present disclosure; as shown in FIG. 3, from the schematic diagram showing a simulation result of the trigger circuit in each of the first example and the second example, it can be seen that when the data voltage control signal Datastep is respectively selected to be −7.45V, −7.4V, −7.3V, −7.2V, −7.1V, −7V, −6.9V, −6.8V, −6.7V (i.e., Datastep=[−7.45V, −7.4V, −7.3V, −7.2V, −7.1V, −7V, −6.9V, −6.8V, −6.7V]), the duty cycles (a duration of a high-level voltage/the period H) corresponding to the clock cycles of the generated clock signals are as follows: for the first example, the duty cycles are 89%, 80%, 64.5%, 52.5%, 43.5%, 36%, 30%, 25.5%, 21.5%, respectively; and for the second example, the duty cycles are 65%, 58%, 46.5%, 37.5%, 31%, 26%, 21.5%, 18.5%, 16%, respectively.

For the first example and the second example, the voltage of the first capacitor controls the seventh transistor M7 to be turned on, and the signal output terminal HF_Output outputs a low-level signal, since the seventh transistor M7 can be fully turned on to output the low-level voltage VSS without waiting for the voltage of the first capacitor to completely increase to 8V, Tf (fall time) of the clock signal at the signal output terminal HF_Output is greatly reduced, and can be reduced to about 2 μs.

A Third Example

Figure 4:
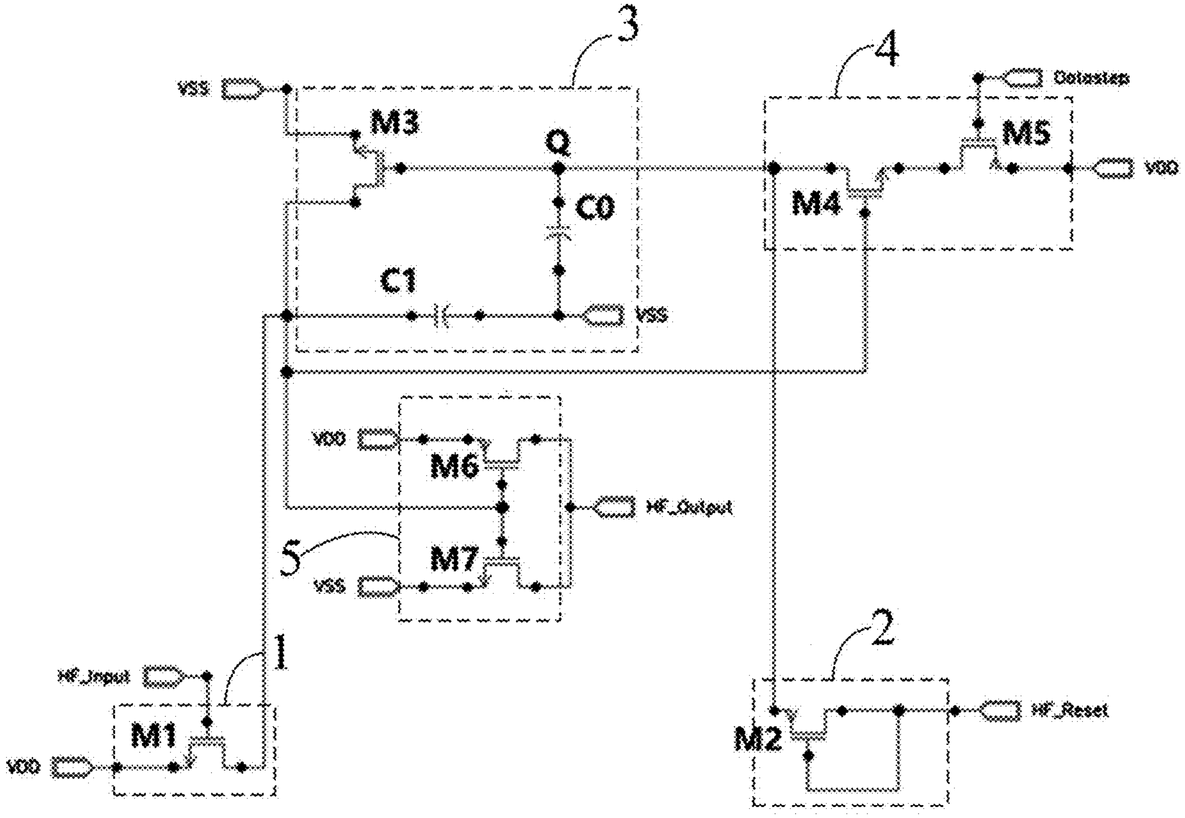
FIG. 4 is a schematic diagram of a trigger circuit in a third example of an embodiment of the present disclosure.

FIG. 4 is a schematic diagram of a trigger circuit in a third example of an embodiment of the present disclosure; as shown in FIG. 4, the trigger circuit includes an input sub-circuit 1, a reset sub-circuit 2, a control sub-circuit 4, a duty cycle adjustment sub-circuit 3, and an output sub-circuit 5. A connection node between the control sub-circuit 4 and the duty cycle adjustment sub-circuit 3 is a first node Q.

In this example, the input sub-circuit 1 may include a first transistor M1; the reset sub-circuit 2 may include a second transistor M2; the duty cycle adjustment sub-circuit 3 may include a third transistor M3, a first capacitor, and a second capacitor; the control sub-circuit 4 may include a fourth transistor M4 and a fifth transistor M5, and the output sub-circuit 5 may include a sixth transistor M6 and a seventh transistor M7. The switching characteristics of the first transistor M1 and the second transistor are opposite to each other, the switching characteristics of the third transistor M3, the fourth transistor M4 and the seventh transistor M7 are all the same as the switching characteristic of the first transistor, and the switching characteristics of the fifth transistor M5 and the sixth transistor M6 are all the same as the switching characteristic of the second transistor M2.

In this example, it is exemplified that the first transistor M1, the third transistor M3, the fifth transistor M5, and the seventh transistor M7 are all N-type transistors, and the second transistor M2, the fourth transistor M4, and the sixth transistor M6 are all P-type transistors.

Specifically, a first electrode of the first transistor M1 is connected to a first power voltage terminal VDD, a second electrode of the first transistor M1 is connected to control electrodes of the sixth transistor M6 and the seventh transistor M7, and a control electrode of the first transistor M1 is connected to an input control signal terminal HF_Input. A first electrode of the second transistor M2 is connected to the first node Q, and a second electrode of the second transistor M2 is connected to a control electrode thereof and a reset signal terminal HF_Reset. A first electrode of the third transistor M3 is connected to the first power voltage terminal VDD, and a second electrode of the third transistor M3 is connected to a first terminal of the first capacitor and the control electrodes of the sixth transistor M6 and the seventh transistor M7; a control electrode of the third transistor M3 is connected to the first node Q and a first terminal of the second capacitor; a second terminal of the first capacitor and a second terminal of the second capacitor are both connected with a second power voltage terminal VSS. A first electrode of the fourth transistor M4 is connected to the first node Q, a second electrode of the fourth transistor M4 is connected to a second electrode of the fifth transistor M5, and a control electrode of the fourth transistor M4 is connected to the control electrodes of the sixth transistor M6 and the seventh transistor M7; a first electrode of the fifth transistor M5 is connected to the first power voltage terminal VDD, and a control electrode of the fifth transistor M5 is connected to a data voltage control terminal. A first electrode of the sixth transistor M6 is connected to the first power voltage terminal VDD, and a second electrode of the sixth transistor M6 is connected to a signal output terminal HF_Output. A first electrode of the seventh transistor M7 is connected to the second power voltage terminal VSS, and a second electrode of the seventh transistor M7 is connected to the signal output terminal HF_Output.

The trigger circuit will be specifically described below with reference to a method for generating a clock signal by the trigger circuit in the above example.

The trigger circuit in the third example is simulated by taking an example, where: the first power voltage is 8V, and the second power voltage is −8V; in a time sequence of input control signal, the high-level signal is at 12V, the low-level signal is at −12V, a period of the input control signal is denoted by H, and H=100 μs, and a duty cycle of the input control signal is equal to a duration of the low-level signal/a duration of the high-level signal, which is equal to 0.1 μs/99.9 μs; in the time sequence of the reset signal, the high-level signal is at 12V, the low-level signal is at −20V, a period of the reset signal is also denoted by H, and H=100 μs, and a duty cycle of the reset signal is equal to a duration of the low-level signal/a duration of the high-level signal, which is equal to 99.9 μs/0.1 μs; a voltage of a data voltage control signal Datastep is respectively selected as 7.05V, 7.1V, 7.15V, 7.2V, 7.25V, 7.3V, 7.35V, and 7.4V (i.e., Datastep=[7.05V, 7.1V, 7.15V, 7.2V, 7.25V, 7.3V, 7.35V, 7.4V]), a capacitance of the first capacitor is 100 fF and a capacitance of the second capacitance is 2 pF. It should be understood that the above parameters can be adjusted according to actual requirements in use of an actual product.

Next, a method for generating a clock signal by the trigger circuit will be described. The method specifically includes the following first stage to fourth stage.

In a first stage, that is, in a beginning stage of a clock cycle, the reset signal, which is a low-level signal, is written into the reset signal terminal HF_Reset, so that the second transistor M2 is turned on, a potential at the first node Q is reset to −20V, and therefore, the third transistor M3 is turned off.

In a second stage, the reset signal, which is a high-level signal, is written into the reset signal terminal HF_Reset, so that the second transistor M2 is turned off, an input control signal, which is a high-level signal, is written into the input control signal terminal HF_Input, so that the first transistor M1 is turned on, at this time, the second power voltage is written into the first capacitor, the sixth transistor M6 is turned off, the seventh transistor M7 is turned on, and the signal output terminal HF_Output outputs the second power voltage, that is, outputs a low-level signal. At the same time, the fourth transistor M4 is turned on to charge the first node Q, the data voltage control signal Datastep written from the data voltage control signal terminal Datastep is written to the control electrode of the fifth transistor M5, and the charging speed of the first node Q is controlled by controlling a magnitude of a saturation current Id of the fifth transistor M5.

In a third stage, after a time period t elapses, the control electrode of the third transistor M3 is charged until a potential of the first node Q minus the second power voltage is greater than a threshold voltage of the third transistor M3, that is, VQ−VSS>Vth, at this time, the third transistor M3 is turned on, the second power voltage is written into the first capacitor, the sixth transistor M6 is turned on, the seventh transistor M7 is turned off, the signal output terminal HF_Output outputs the first power voltage, that is, outputs a high-level signal, and at the same time, the fourth transistor M4 is turned off, and the first node Q stops charging.

In a fourth stage: the reset signal of the reset signal terminal HF_Reset is a high-level signal, the first node Q is reset to be at −20V, in this stage, the third transistor M3 is turned off, the second power voltage is written into the first capacitor, so that the sixth transistor M6 is turned on, the seventh transistor M7 is turned off, and the signal output terminal HF_Output continuously outputs the high-level signal.

In the next cycle, the second stage to the fourth stage are repeated.

It can be seen that the data voltage control signal Datastep is written into the control electrode of the fifth transistor M5, and the charging speed of the first node Q is controlled by controlling the magnitude of the saturation current Id of the fifth transistor M5, and the time period t required for the first node Q to be charged until VQ−VSS>Vth is met is a duration of the high-level signal in the clock cycle of the output clock signal. By adjusting a magnitude of the voltage of the data voltage control signal Datastep, output clock signals with different duty cycles can be obtained.

A Fourth Example

Figure 5:
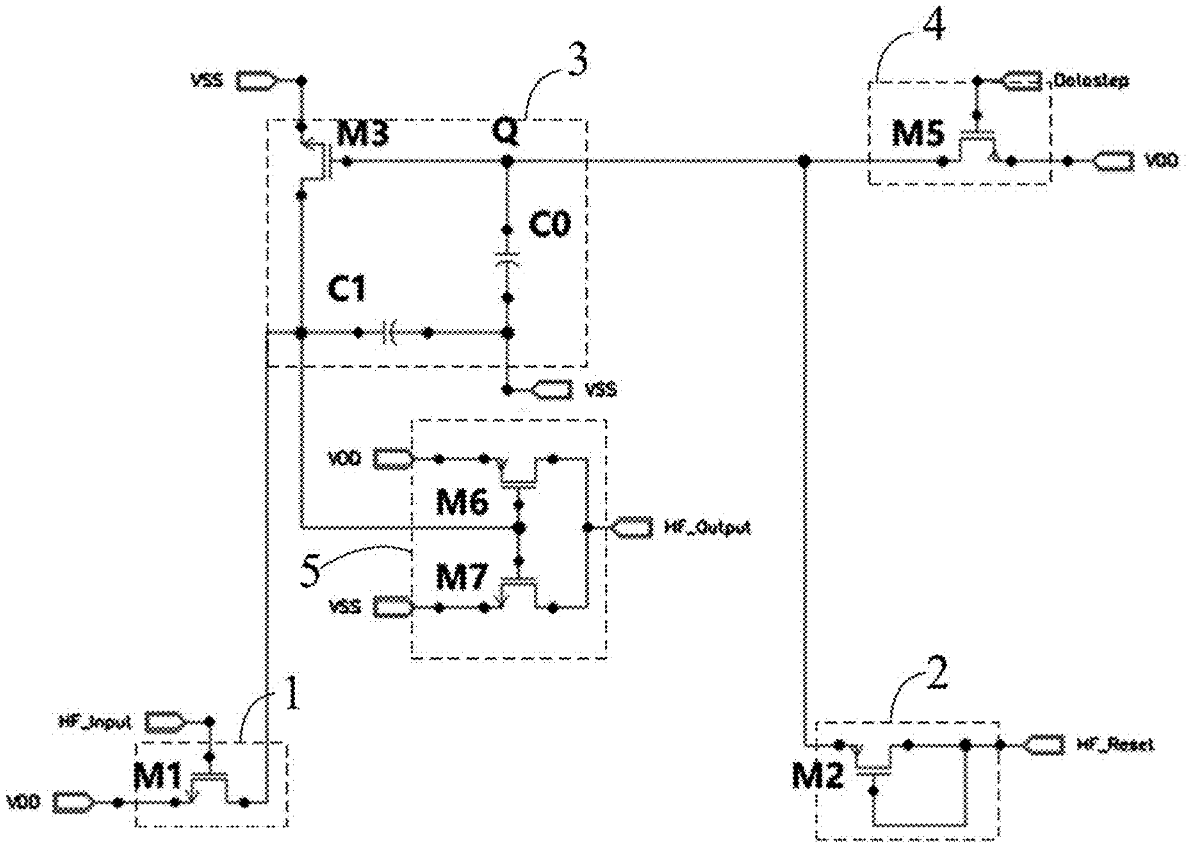
FIG. 5 is a schematic diagram of a trigger circuit in a fourth example of an embodiment of the present disclosure.

FIG. 5 is a schematic diagram of a trigger circuit in a fourth example of an embodiment of the present disclosure; as shown in FIG. 5, the trigger circuit includes an input sub-circuit 1, a reset sub-circuit 2, a control sub-circuit 4, a duty cycle adjustment sub-circuit 3, and an output sub-circuit 5. A connection node between the control sub-circuit 4 and the duty cycle adjustment sub-circuit 3 is a first node Q.

In this example, the input sub-circuit 1 may include a first transistor M1; the reset sub-circuit 2 may include a second transistor M2; the duty cycle adjustment sub-circuit 3 may include a third transistor M3, a first capacitor, and a second capacitor; the control sub-circuit 4 may include a fifth transistor M5, and the output sub-circuit 5 may include a sixth transistor M6 and a seventh transistor M7. The switching characteristics of the first transistor M1 and the second transistor are opposite to each other, the switching characteristics of the third transistor M3 and the seventh transistor M7 are the same as the switching characteristic of the first transistor, and the switching characteristics of the fifth transistor M5 and the sixth transistor M6 are the same as the switching characteristic of the second transistor M2.

In this example, it is exemplified that the first transistor M1, the third transistor M3, the fifth transistor M5, and the seventh transistor M7 are all N-type transistors, and the second transistor M2 and the sixth transistor M6 are all P-type transistors.

Specifically, a first electrode of the first transistor M1 is connected to the first power voltage terminal VDD, a second electrode of the first transistor M1 is connected to control electrodes of the sixth transistor M6 and the seventh transistor M7, and a control electrode of the first transistor M1 is connected to an input control signal terminal HF_Input. A first electrode of the second transistor M2 is connected to the first node Q, and a second electrode of the second transistor M2 is connected to a control electrode thereof and a reset signal terminal HF_Reset. A first electrode of the third transistor M3 is connected to the first power voltage terminal VDD, and a second electrode of the third transistor M3 is connected to a first terminal of the first capacitor, control electrodes of the sixth transistor M6 and the seventh transistor M7; a control electrode of the third transistor M3 is connected to the first node Q and a first terminal of the second capacitor; a second terminal of the first capacitor and a second terminal of the second capacitor are both connected with the second power voltage terminal VSS. A first electrode of the fifth transistor M5 is connected to the first power voltage terminal VDD, and a control electrode of the fifth transistor M5 is connected to a data voltage control terminal. A first electrode of the sixth transistor M6 is connected to the first power voltage terminal VDD, and a second electrode of the sixth transistor M6 is connected to a signal output terminal HF_Output. A first electrode of the seventh transistor M7 is connected to the second power voltage terminal VSS, and a second electrode of the seventh transistor M7 is connected to the signal output terminal HF_Output.

The trigger circuit will be specifically described below with reference to a method for generating a clock signal by the trigger circuit in the above example.

The trigger circuit in the third example is simulated by taking an example, where: the first power voltage is 8V, and the second power voltage is −8V; in a time sequence of an input control signal, the high-level signal is at 12V, the low-level signal is at −12V, a period of the input control signal is denoted by H, and H=100 μs, and a duty cycle of the input control signal is equal to a duration of the low-level signal/a duration of the high-level signal, which is equal to 0.1 μs/99.9 μs; in a time sequence of the reset signal, the high-level signal is at 12V, the low-level signal is at −20V, the period of a reset signal is also denoted by H, and H=100 μs, and a duty cycle of the reset signal is equal to a duration of the low-level signal/a duration of the high-level signal, which is equal to 99.9 μs/0.1 μs; a voltage of a data voltage control signal Datastep may be respectively selected to be 7.05V, 7.1V, 7.15V, 7.2V, 7.25V, 7.3V, 7.35V, and 7.4V (i.e., Datastep=[7.05V, 7.1V, 7.15V, 7.2V, 7.25V, 7.3V, 7.35V, 7.4V]), a capacitance of the first capacitor is 100 fF and a capacitance of the second capacitance is 2 pF. It should be understood that the above parameters can be adjusted according to actual requirements in use of an actual product.

Next, the method for generating a clock signal by the trigger circuit will be described. The method specifically includes the following first stage to fourth stage.

In a first stage, that is, in a beginning stage of a clock cycle, the reset signal, which is a low-level signal, is written into the reset signal terminal HF_Reset, so that the second transistor M2 is turned on, a potential at the first node Q is reset to −20V, and therefore, the third transistor M3 is turned off.

In the second stage: the reset signal, which is a high-level signal, is written into the reset signal terminal HF_Reset, so that the second transistor M2 is turned off, the input control signal, which is a high-level signal, is written into the input control signal terminal HF_Input, so that the first transistor M1 is turned on, at this time, the second power voltage is written into the first capacitor, the sixth transistor M6 is turned off, the seventh transistor M7 is turned on, and the signal output terminal HF_Output outputs the second power voltage, that is, outputs a low-level signal. At the same time, a data voltage control signal Datastep written into the data voltage control signal terminal Datastep is written to the control electrode of the fifth transistor M5, and a charging speed of the first node Q is controlled by controlling a magnitude of a saturation current Id of the fifth transistor M5.

In a third stage, after a time period t elapses, the control electrode of the third transistor M3 is charged until a potential of the first node Q minus the second power voltage is greater than a threshold voltage of the third transistor M3, that is, VQ−VSS>Vth, the third transistor M3 is turned on, the second power voltage is written into the first capacitor, the sixth transistor M6 is turned on, the seventh transistor M7 is turned off, and the signal output terminal HF_Output outputs the first power voltage, that is, outputs a high-level signal.

In a fourth stage, the reset signal of the reset signal terminal HF_Reset is a high-level signal, a potential of the first node Q is reset to −20V, at this stage, the third transistor M3 is turned off, the second power voltage is written into the first capacitor, the sixth transistor M6 is turned on, the seventh transistor M7 is turned off, and the signal output terminal HF_Output continuously outputs a high-level signal.

In the next cycle, the second stage to the fourth stage are repeated.

It can be seen that the data voltage control signal Datastep is written into the control electrode of the fifth transistor M5, and the charging speed of the first node Q is controlled by controlling the magnitude of the saturation current Id of the fifth transistor M5, and the time period t required for the first node Q to be charged until VQ−VSS>Vth is met is a duration of the high-level signal in the clock cycle of the clock signal. By adjusting the voltage of the data voltage control signal Datastep, output clock signals with different duty cycles can be obtained.

Simulation of the trigger circuit in each of the third example and the fourth example is made according to the simulation conditions described above and an aspect ratio (W/L=5/5) of the transistor.

Figure 6:
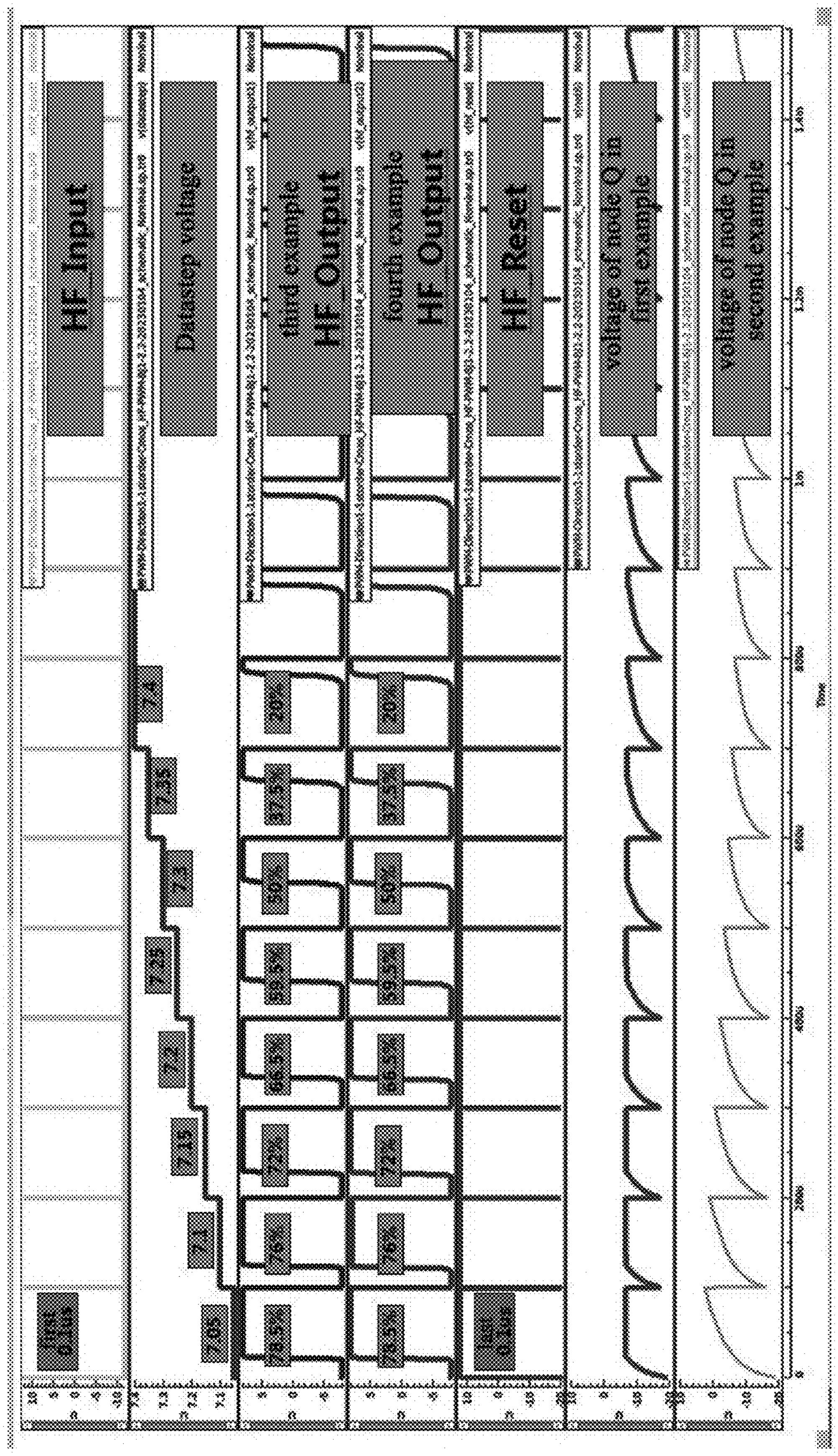
FIG. 6 is a schematic diagram showing a simulation of the trigger circuit in each of the third example and the fourth example of the embodiment of the present disclosure.

FIG. 6 is a schematic diagram showing a simulation of the trigger circuit in each of the third example and the fourth example of the embodiment of the present disclosure; as shown in FIG. 6, from the schematic diagram showing a simulation result of the trigger circuit in each of the third example and the fourth example, it can be seen that in a case where the data voltage control signal Datastep is respectively selected to be 7.05V, 7.1V, 7.15V, 7.2V, 7.25V, 7.3V, 7.35V, and 7.4V (i.e., Datastep=[7.05V, 7.1V, 7.15V, 7.2V, 7.25V, 7.3V, 7.35V, 7.4V]), the duty cycles (a duration of the high voltage/cycle H) corresponding to the clock cycle of the generated clock signal are as follows: for the third example, the duty cycles are 78.5%, 76%, 72%, 66.5%, 59.5%, 50%, 37.5%, 20%, respectively; for the fourth example, the duty cycles are 78.5%, 76%, 72%, 66.5%, 59.5%, 50%, 37.5%, 20%, respectively.

For the third example and the fourth example, the sixth transistor M6 is controlled to be turned on by the voltage of the first capacitor, and the signal output terminal HF_Output outputs a high-level signal, since the sixth transistor M6 can be turned on sufficiently to output a high-level signal without waiting for the voltage of the first capacitor to be completely reduced to −8V, Tr (rise time) of the clock signal output from the signal output terminal HF_Output is greatly reduced, and can be reduced to about 5 μs.

A Fifth Example

Figure 7:
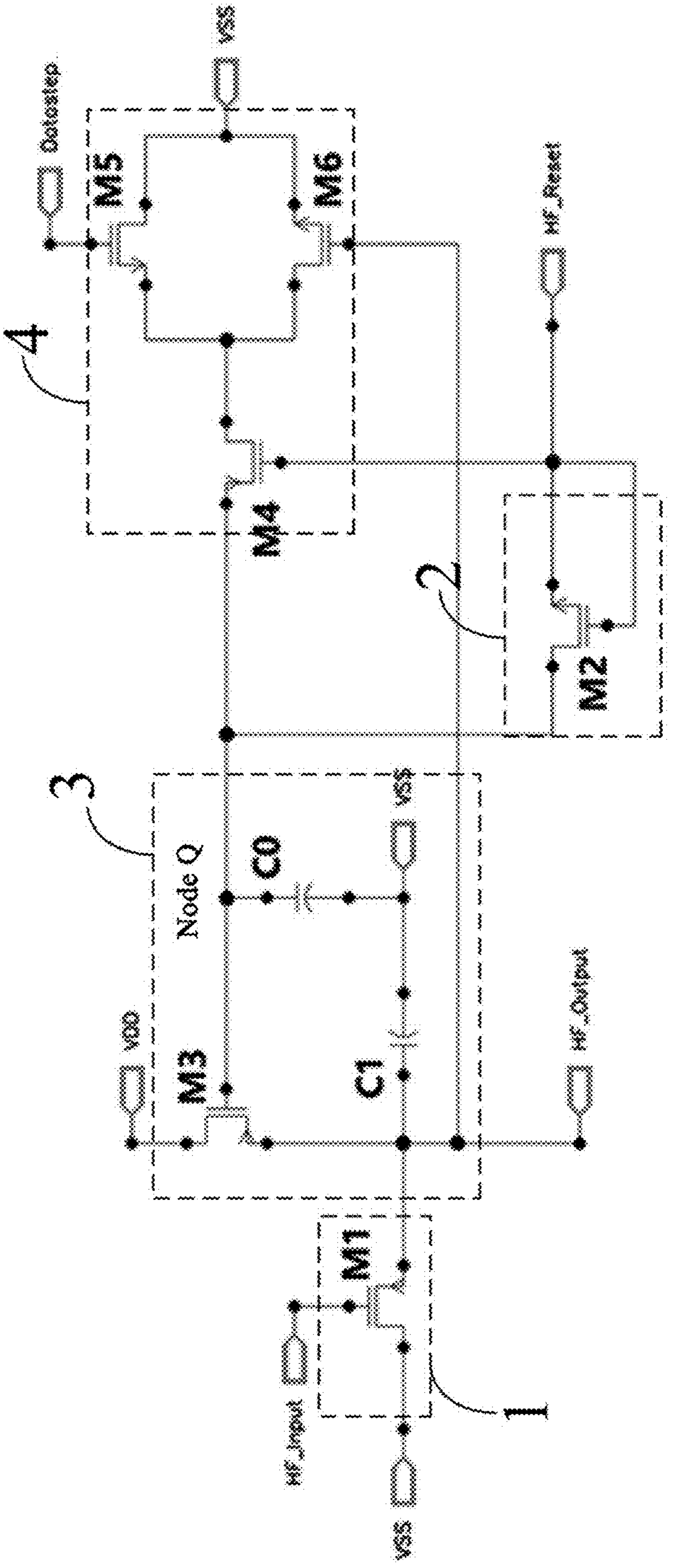
FIG. 7 is a schematic diagram of a trigger circuit in a fifth example of an embodiment of the present disclosure.

FIG. 7 is a schematic diagram of a trigger circuit in a fifth example of an embodiment of the present disclosure; as shown in FIG. 7, the trigger circuit includes an input sub-circuit 1, a reset sub-circuit 2, a control sub-circuit 4, and a duty cycle adjustment sub-circuit 3. A connection node between the control sub-circuit 4 and the duty cycle adjustment sub-circuit 3 is a first node Q.

In this example, the input sub-circuit 1 may include a first transistor M1; the reset sub-circuit 2 may include a second transistor M2; the duty cycle adjustment sub-circuit 3 may include a third transistor M3, a first capacitor, and a second capacitor; the control sub-circuit 4 may include a fourth transistor M4, a fifth transistor M5, and a sixth transistor M6. The switching characteristics of the first transistor M1 and the second transistor are opposite to each other, the switching characteristics of the third transistor M3 and the fourth transistor M4 are both the same as the switching characteristic of the first transistor, and the switching characteristics of the fifth transistor M5 and the sixth transistor M6 are both the same as the switching characteristic of the second transistor M2.

In this example, it is exemplified that the first transistor M1, the third transistor M3, and the fourth transistor M4 all employ P-type transistors, and the second transistor M2, the fifth transistor M5, and the sixth transistor M6 all employ N-type transistors.

Specifically, a first electrode of the first transistor M1 is connected to a second power voltage terminal VSS, a second electrode of the first transistor M1 is connected to a signal output terminal HF_Input, and a control electrode of the first transistor M1 is connected to an input control signal terminal HF_Input. A first electrode of the second transistor M2 is connected to the first node Q, and a second electrode of the second transistor M2 is connected to a control electrode thereof and a reset signal terminal HF_Reset. A first electrode of the third transistor M3 is connected to a first power voltage terminal VDD, and a second electrode of the third transistor M3 is connected to a first terminal of the first capacitor, a control electrode of the sixth transistor M6 and a signal output terminal HF_Output; a control electrode of the third transistor M3 is connected to the first node Q and a first terminal of the second capacitor; a second terminal of the first capacitor and a second terminal of the second capacitor are both connected with the second power voltage terminal VSS. A first electrode of the fourth transistor M4 is connected to the first node Q, a second electrode of the fourth transistor M4 is connected to a second electrode of the fifth transistor M5 and a first electrode of the sixth transistor M6, and a control electrode of the fourth transistor M4 is connected to the reset signal terminal HF_Reset; a first electrode of the fifth transistor M5 is connected to the second power voltage terminal VSS and a second electrode of the sixth transistor M6, and a control electrode of the fifth transistor M5 is connected to a data voltage control terminal. A control electrode of the sixth transistor M6 is connected to the signal output terminal HF_Output.

The trigger circuit will be specifically described below with reference to a method for generating a clock signal by the trigger circuit in the above example.

The trigger circuit in the fifth example is simulated by taking an example, where: the first power voltage is 8V, and the second power voltage is −8V; in a time sequence of an input control signal, the high-level signal is at 12V, the low-level signal is at −12V, a period of the input control signal is denoted by H, and H=100 μs, and a duty cycle of the input control signal is equal to a duration of the low-level signal/a duration of the high-level signal, which is equal to 0.1 μs/99.9 μs; in a time sequence of a reset signal, the high-level signal is at 20V, the low-level signal is at −12V, a period of the reset signal is also denoted by H, and H=100 μs, and a duty cycle of the reset signal is equal to a duration of the low-level signal/a duration of the high-level signal, which is equal to 99.9 μs/0.1 μs; a voltage of a data voltage control signal Datastep may be respectively selected to be −7.72V, −7.7V, −7.6V, −7.5V, −7.3V, −7.1V, −6.9V, and −6.7V (i.e., Datastep=[−7.72V, −7.7V, −7.6V, −7.5V, −7.3V, −7.1V, −6.9V, −6.7V]), a capacitance of the first capacitor is 20 fF and a capacitance of the second capacitance is 2 pF. It should be understood that the above parameters can be adjusted according to actual requirements in use of an actual product.

Next, the method for generating a clock signal by the trigger circuit will be described. The method specifically includes the following first stage to fourth stage.

In a first stage, that is, in a beginning stage of a clock cycle, the reset signal, which is a high-level signal, is written into the reset signal terminal HF_Reset, so that the second transistor M2 is turned on, a potential at the first node Q is reset to 20V, and therefore, the third transistor M3 is turned off.

In a second stage, the reset signal, which is a low-level signal, is written into the reset signal terminal HF_Reset, so that the second transistor M2 is turned off, and the fourth transistor M4 is turned on; an input control signal, which is a low-level signal, is written into the input control signal terminal HF_Input, so that the first transistor M1 is turned on, at this time, the second power voltage is written into the first capacitor, and the signal output terminal HF_Output outputs the second power voltage, that is, outputs a low-level signal. At the same time, the sixth transistor M6 is turned off, the first node Q is discharged to the second power voltage terminal VSS, a data voltage control signal Datastep written by a data voltage control signal terminal Datastep is written to the control electrode of the fifth transistor M5, and a discharging speed of the first node Q is controlled by controlling a magnitude of a saturation current Id of the fifth transistor M5.

In a third stage, after a time period t elapses, the control electrode of the third transistor M3 is discharged until the potential at the first node Q minus the first power voltage is less than a threshold voltage of the third transistor M3, that is, VQ−VDD<Vth, the third transistor M3 is turned on, the first power voltage is written into the first capacitor, the signal output terminal HF_Output outputs the first power voltage, that is, outputs a high-level signal, and at the same time, the sixth transistor M6 is turned on, and the first node Q is quickly discharged to the second power voltage VSS.

In a fourth stage, the reset signal at the reset signal terminal HF_Reset is a low-level signal, so that the second transistor M2 is turned on, the fourth transistor M4 is turned off, the first node Q is reset to be at 20V, the third transistor M3 is turned off in this stage, the first capacitor holds a high voltage signal, and the signal output terminal HF_Output continuously outputs the high-level signal.

The next cycle starts to repeat the second to fourth phases.

It can be seen that the data voltage control signal Datastep is written into the control electrode of the fifth transistor M5, and the discharging speed of the first node Q is controlled by controlling the magnitude of the saturation current Id of the fifth transistor M5, and the time period t required for the first node Q to discharge until VQ−VDD<Vth is met is a duration of the high-level signal in the clock cycle of the output clock signal. By adjusting a magnitude of the voltage of the data voltage control signal Datastep, output clock signals with different duty cycles can be obtained.

Simulation of the trigger circuit in the fifth example is made according to the simulation conditions described above and an aspect ratio (W/L=5/5) of the transistor.

Figure 8:
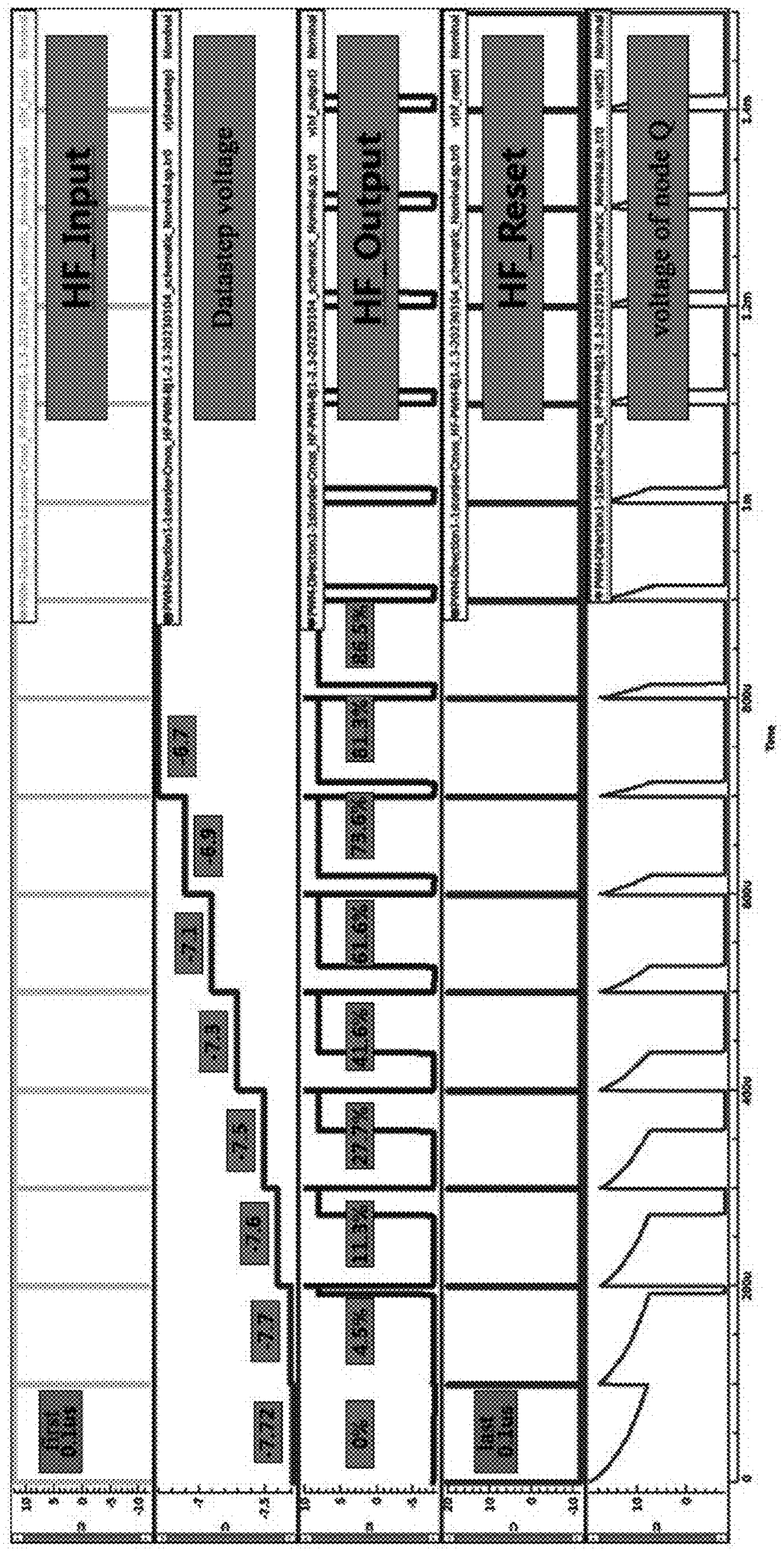
FIG. 8 is a schematic diagram showing a simulation of the trigger circuit in the fifth example of the embodiment of the present disclosure.

FIG. 8 is a schematic diagram showing a simulation of the trigger circuit in the fifth example of the embodiment of the present disclosure; as shown in FIG. 8, from the schematic diagram showing a simulation result of the trigger circuit in the fifth example, it can be seen that when the data voltage control signal Datastep is respectively selected to be −7.72V, −7.7V, −7.6V, −7.5V, −7.3V, −7.1V, −6.9V, and −6.7V (i.e., Datastep=[−7.72V, −7.7V, −7.6V, −7.5V, −7.3V, −7.1V, −6.9V, −6.7V]), for the fifth example, the duty cycles (a duration of a high voltage/cycle H) corresponding to the clock cycle of the generated clock signal are: 4.5%, 11.3%, 27.7%, 41.6%, 61.6%, 73.6%, 81.3%, 86.5%, respectively.

For the fifth example, a reset charging time of the first node Q, and thus a rising time Tr are optimized by providing the fourth transistor M4 and the sixth transistor M6. When the first node Q is reset, the reset signal terminal HF_Reset controls the fourth transistor M4 to cut off a discharging loop of the first node Q, thereby preventing leakage current of the first node Q from occurring when the first node Q is reset, thus shortening the reset charging time of the node Q. When the first node Q turns the third transistor M3 on, the first power voltage is written into the third transistor M3, the signal output terminal HF_Output starts to output a high-level signal, and the sixth transistor M6 is turned on, a slowly discharging of the first node Q controlled by the fifth transistor M5 is changed into a fast discharging, the potential at the first node Q rapidly decreases to the second power voltage, the third transistor M3 is fully turned on, the voltage of the signal output terminal HF_Output rapidly increases to the first power voltage, and the rise time Tr is only 0.2 μs.

A Sixth Example

Figure 9:
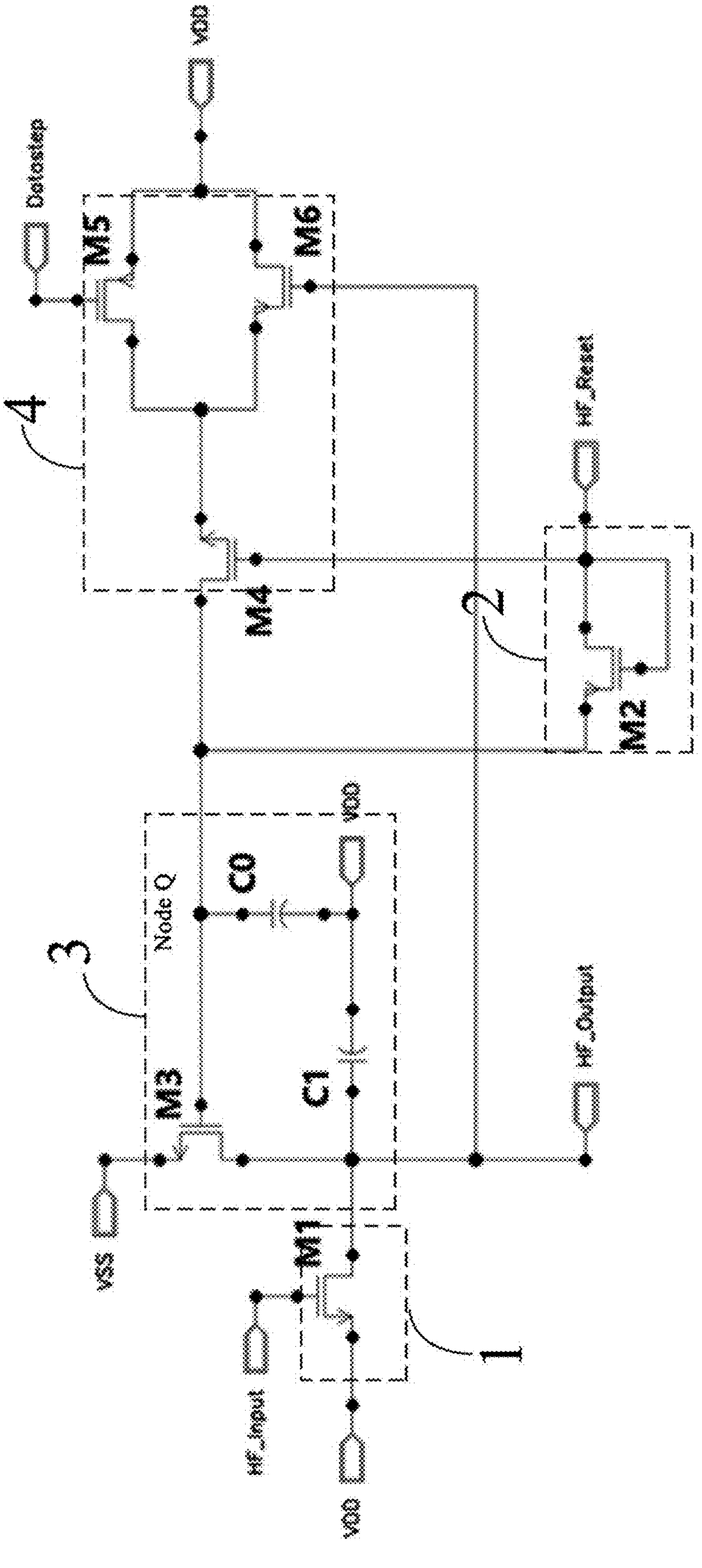
FIG. 9 is a schematic diagram of a trigger circuit in a sixth example of an embodiment of the present disclosure.

FIG. 9 is a schematic diagram of a trigger circuit in a sixth example of the embodiment of the present disclosure; as shown in FIG. 9, the trigger circuit includes an input sub-circuit 1, a reset sub-circuit 2, a control sub-circuit 4, and a duty cycle adjustment sub-circuit 3. A connection node between the control sub-circuit 4 and the duty cycle adjustment sub-circuit 3 is a first node Q.

In this example, the input sub-circuit 1 may include a first transistor M1; the reset sub-circuit 2 may include a second transistor M2; the duty cycle adjustment sub-circuit 3 may include a third transistor M3, a first capacitor, and a second capacitor; the control sub-circuit 4 may include a fourth transistor M4, a fifth transistor M5, and a sixth transistor M6. The switching characteristics of the first transistor M1 and the second transistor are opposite to each other, the switching characteristics of the third transistor M3 and the fourth transistor M4 are both the same as the switching characteristic of the first transistor, and the switching characteristics of the fifth transistor M5 and the sixth transistor M6 are both the same as the switching characteristic of the second transistor M2.

In this example, it is exemplified that the first transistor M1, the third transistor M3, and the fourth transistor M4 all employ N-type transistors, and the second transistor M2, the fifth transistor M5, and the sixth transistor M6 all employ P-type transistors.

Specifically, a first electrode of the first transistor M1 is connected to a first power voltage terminal VDD, a second electrode of the first transistor M1 is connected to a signal output terminal HF_Output, and a control electrode of the first transistor M1 is connected to an input control signal terminal HF_Input. A first electrode of the second transistor M2 is connected to the first node Q, and a second electrode of the second transistor M2 is connected to a control electrode thereof and a reset signal terminal HF_Reset. A first electrode of the third transistor M3 is connected to a second power voltage terminal VSS, a second electrode of the third transistor M3 is connected to a first terminal of the first capacitor, a control electrode of the sixth transistor M6 and the signal output terminal HF_Output; a control electrode of the third transistor M3 is connected to the first node Q and a first terminal of the second capacitor; a second terminal of the first capacitor and a second terminal of the second capacitor are both connected with the first power voltage terminal VDD. A first electrode of the fourth transistor M4 is connected to the first node Q, a second electrode of the fourth transistor M4 is connected to a second electrode of the fifth transistor M5 and a first electrode of the sixth transistor M6, and a control electrode of the fourth transistor M4 is connected to the reset signal terminal HF_Reset; a first electrode of the fifth transistor M5 is connected to the first power voltage terminal VDD and a second electrode of the sixth transistor M6, and a control electrode of the fifth transistor M5 is connected to a data voltage control terminal. A control electrode of the sixth transistor M6 is connected to the signal output terminal HF_Output.

The trigger circuit will be specifically described below with reference to a method for generating a clock signal by the trigger circuit in the above example.

The trigger circuit in the sixth example is simulated by taking an example, where: the first power voltage is 8V, and the second power voltage is −8V; in a time sequence of input control signal, the high-level signal is at 12V, the low-level signal is at −12V, a period of the input control signal is denoted by H, and H=100 μs, and a duty cycle of the input signal is equal to a duration of the low-level signal/a duration of the high-level signal, which is equal to 0.1 μs/99.9 μs; in the time sequence of a reset signal, the high-level signal is at 12V, the low-level signal is at −20V, the period of the reset signal is also denoted by H, and H=100 μs, and a duty cycle of the reset signal is equal to a duration of the low-level signal/a duration of the high-level signal, which is equal to 99.9 μs/0.1 μs; a voltage of a data voltage control signal Datastep may be respectively selected to be 6.8V, 3.9V, 7V, 7.1V, 7.2V, 7.3V, and 7.4V (i.e., Datastep=[6.8V, 3.9V, 7V, 7.1V, 7.2V, 7.3V, 7.4V]), a capacitance of the first capacitor is 200 fF and a capacitance of the second capacitance is 2 pF. It should be understood that the above parameters can be adjusted according to actual requirements in use of an actual product.

Next, a method for generating a clock signal by the trigger circuit will be described. The method specifically includes the following first stage to fourth stage.

In a first stage, that is, in a beginning stage of a clock cycle, the reset signal, which is a low-level signal, is written into the reset signal terminal HF_Reset, so that the second transistor M2 is turned on, the fourth transistor M4 is turned off, a potential at the first node Q is reset to −20V, and therefore, the third transistor M3 is turned off.

In a second stage, the reset signal, which is a low-level signal, is written into the reset signal terminal HF_Reset, so that the second transistor M2 is turned off, and the fourth transistor M4 is turned on; an input control signal, which is a high-level signal, is written into the input control signal terminal HF_Input, so that the first transistor M1 is turned on, at this time, the first power voltage is written into the first capacitor, and the signal output terminal HF_Output outputs the first power voltage, that is, outputs a high-level signal. At the same time, the sixth transistor M6 is turned off, the first power voltage terminal VDD charges the first node Q, a data voltage control signal Datastep written by a data voltage control signal terminal Datastep is written to the control electrode of the fifth transistor M5, and a charging speed of the first node Q is controlled by controlling a magnitude of a saturation current Id of the fifth transistor M5.

In a third stage, after a time period t elapses, the control electrode of the third transistor M3 is discharged until the potential at the first node Q minus the second power voltage is greater than a threshold voltage of the third transistor M3, that is, VQ−VSS>Vth, the third transistor M3 is turned on, the second power voltage is written into the first capacitor, the signal output terminal HF_Output outputs the second power voltage, that is, outputs a low-level signal, and at the same time, the sixth transistor M6 is turned on, and the first node Q is quickly charged to the first power voltage VDD.

In a fourth stage, the reset signal at the reset signal terminal HF_Reset is a low-level signal, so that the second transistor M2 is turned on, the fourth transistor M4 is turned off, the first node Q is reset to be at 20V, the third transistor M3 is turned off in this stage, the first capacitor holds a low voltage signal, and the signal output terminal HF_Output continuously outputs the low-level signal.

In the next cycle, the second stage to the fourth stage are repeated.

It can be seen that the data voltage control signal Datastep is written into the control electrode of the fifth transistor M5, and the discharging speed of the first node Q is controlled by controlling the magnitude of the saturation current Id of the fifth transistor M5, and the time period t required for the first node Q to discharge until VQ−VSS>Vth is met is a duration of the high-level signal in the clock cycle of the output clock signal. By adjusting a magnitude of the voltage of the data voltage control signal Datastep, output clock signals with different duty cycles can be obtained.

Simulation of the trigger circuit in the sixth example is made according to the simulation conditions described above and an aspect ratio (W/L=5/5) of the transistor.

Figure 10:
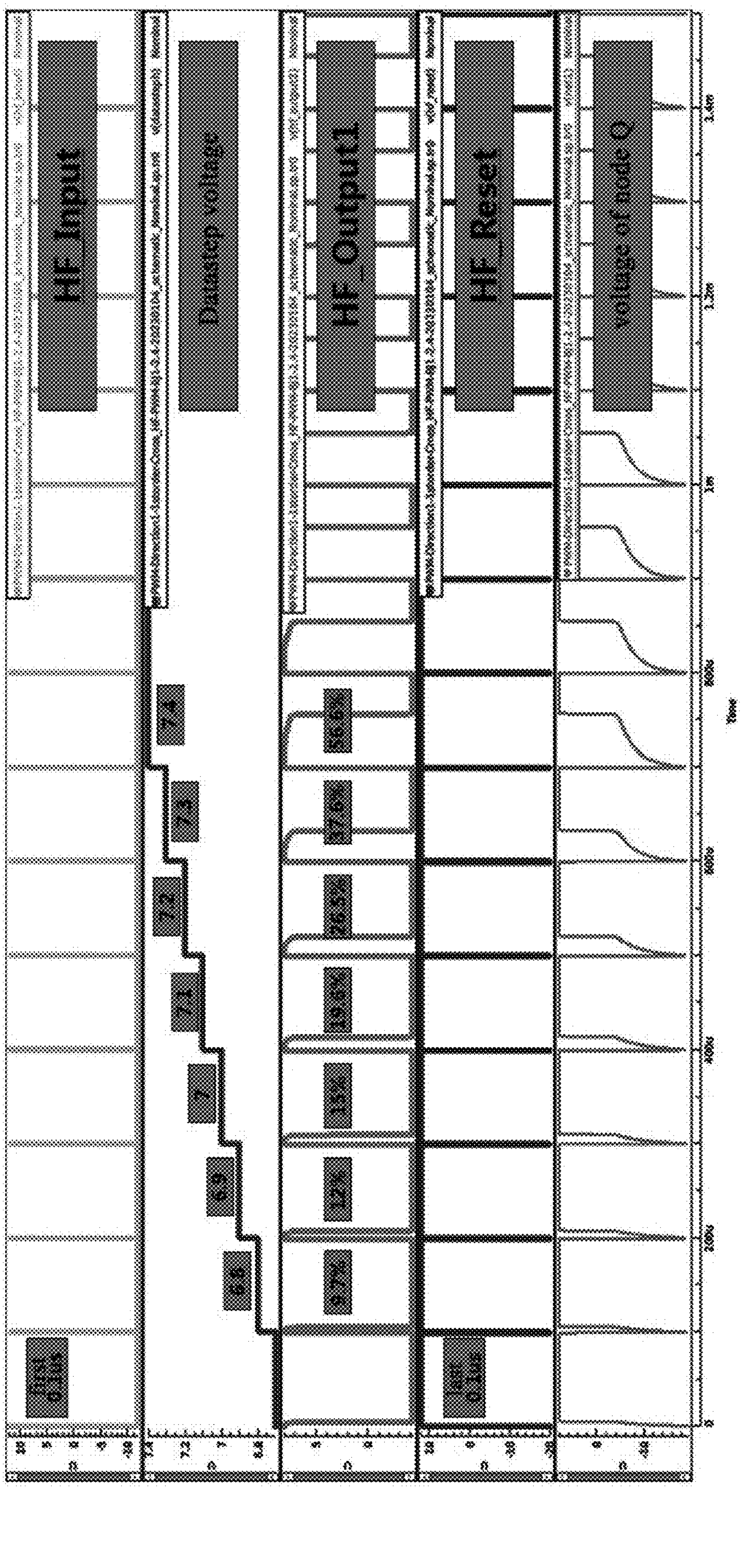
FIG. 10 is a schematic diagram showing a simulation of the trigger circuit in the sixth example of the embodiment of the present disclosure.

FIG. 10 is a schematic diagram showing a simulation of the trigger circuit in the sixth example of the embodiment of the present disclosure; as shown in FIG. 10, from the schematic diagram showing a simulation result of the trigger circuit in the sixth example, it can be seen that when the data voltage control signal Datastep is respectively selected to be 6.8V, 3.9V, 7V, 7.1V, 7.2V, 7.3V, and 7.4V (i.e., Datastep=[6.8V, 3.9V, 7V, 7.1V, 7.2V, 7.3V, 7.4V]), for the sixth example, the duty cycles (a duration of a high voltage/cycle H) corresponding to the clock cycle of the generated clock signal are: 9.7%, 12%, 15%, 19.6%, 26.5%, 37.6%, 56.6%, respectively.

In addition, a reset charging time of the first node Q, and a fall time Tf are optimized by providing the fourth transistor M4 and the sixth transistor M6 in this example. When the first node Q is reset, the reset signal terminal HF_Reset controls the fourth transistor M4 to cut off a discharging loop of the first node Q, thereby preventing leakage current of the first node Q from occurring when the first node Q is reset, thus shortening the reset charging time of the node Q. When the first node Q turns the third transistor M3 on, the first power voltage is written into the third transistor M3, the signal output terminal HF_Output starts to output a high-level signal, and the sixth transistor M6 is turned on, slowly charging of the first node Q controlled by the fifth transistor M5 is changed into a fast charging, the potential at the first node Q rapidly rises to the first power voltage, the third transistor M3 is fully turned on, the voltage of the signal output terminal HF_Output rapidly falls to the second power voltage, and the fall time Tf is only 0.2 μs.

Figure 11:
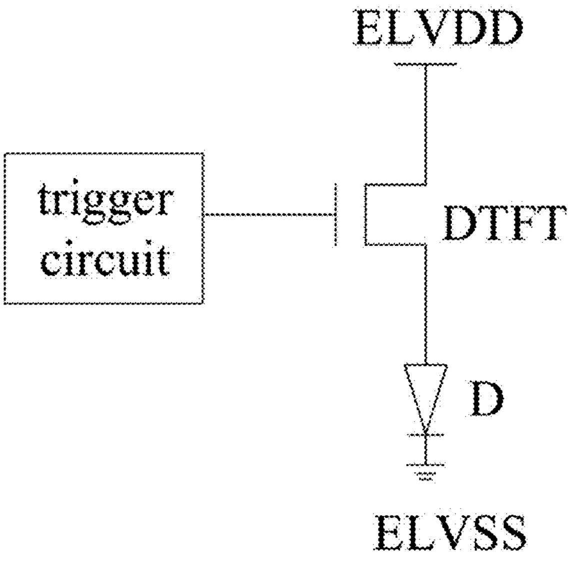
FIG. 11 is a schematic diagram of a pixel driving circuit according to an embodiment of the present disclosure.

In a second aspect, FIG. 11 is a schematic diagram of a pixel driving circuit according to an embodiment of the present disclosure. As shown in FIG. 11, the embodiment of the present disclosure provides a pixel driving circuit, including a driving transistor DTFT and a trigger circuit connected to a control electrode of the driving transistor. The trigger circuit may be the trigger circuit in any one of the above examples. A first electrode of the driving transistor DTFT is connected to a first driving power terminal, a second electrode of the driving transistor DTFT is connected to a first electrode of a light emitting device to be driven, and a second electrode of the light emitting device to be driven is connected to a second driving power terminal. The driving circuit has a simple structure, so that a voltage at the first driving power terminal is in a range from about 3V to 5V. In some examples, the light emitting device includes, but is not limited to, an LED or an OLED.

For the pixel driving circuit, when the driving transistor DTFT is turned on, a current drives the light emitting device to emit light, and when the driving transistor DTFT is turned off, the light emitting ends. A signal output by the output terminal HF_Output of the AND gate of the trigger circuit is written into a control electrode of the driving transistor DTFT of the pixel driving circuit, and a turn-on duration of the driving transistor DTFT is adjusted by adjusting the duty cycle of the clock signal, to realize the gray scale display. When the duty cycle is low, the driving transistor DTFT has the less turn-on duration, so that a light emitting duration is less, to realize a low gray scale display. When the duty cycle is high, the driving transistor DTFT has the great turn-on duration, so that the light emitting duration is great, to realize a high gray scale display. In the embodiment of the present disclosure, in order to realize the gray scale display, it is only necessary for the light emitting device to emit light having a stable brightness at any one or more fixed levels. The low gray scale display is realized by controlling the light emitting duration, so that the problem that light emitting of the light emitting device is unstable at a low brightness is avoided.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A trigger circuit, comprising: an input sub-circuit, a reset sub-circuit, a control sub-circuit, a duty cycle adjustment sub-circuit and an output sub-circuit, wherein the input sub-circuit is configured to control a signal output terminal of the output sub-circuit to output a first power voltage or output a second power voltage in response to an input control signal;

the reset sub-circuit is configured to reset, in response to a reset signal, a first node through the reset signal, and the first node is a connection node between the control sub-circuit and the duty cycle adjustment sub-circuit;

the control sub-circuit is configured to control a potential at the first node in response to a data voltage control signal; and the duty cycle adjustment sub-circuit is configured to adjust a duty cycle of a clock signal output from the signal output terminal of the output sub-circuit in response to the potential at the first node, and a potential of the clock signal jumps between the first power voltage and the second power voltage, and wherein the input sub-circuit comprises a first transistor, a first electrode of the first transistor is connected with a second power voltage terminal, a second electrode of the first transistor is connected with the output sub-circuit, and a control electrode of the first transistor is connected with an input control signal terminal, and the reset sub-circuit comprises a second transistor, and a switching characteristic of the second transistor is opposite to a switching characteristic of the first transistor, wherein a first electrode of the second transistor is connected with the first node, and a second electrode of the second transistor is connected with a control electrode of the second transistor and a reset signal terminal, or the input sub-circuit comprises a first transistor, a first electrode of the first transistor is connected with a first power voltage terminal, a second electrode of the first transistor is connected with the output sub-circuit, and a control electrode of the first transistor is connected with an input control signal terminal, and the reset sub-circuit comprises a second transistor, and a switching characteristic of the second transistor is opposite to a switching characteristic of the first transistor, wherein a first electrode of the second transistor is connected with the first node, and a second electrode of the second transistor is connected with a control electrode of the second transistor and a reset signal terminal.

2. The trigger circuit of claim 1, wherein the input sub-circuit comprises a first transistor, a first electrode of the first transistor is connected with a second power voltage terminal, a second electrode of the first transistor is connected with the output sub-circuit, and a control electrode of the first transistor is connected with an input control signal terminal, and the reset sub-circuit comprises a second transistor, and a switching characteristic of the second transistor is opposite to a switching characteristic of the first transistor, wherein a first electrode of the second transistor is connected with the first node, and a second electrode of the second transistor is connected with a control electrode of the second transistor and a reset signal terminal, and wherein the duty cycle adjustment sub-circuit comprises a third transistor, a first capacitor, and a second capacitor, and a switching characteristic of the third transistor is the same as a switching characteristic of the first transistor; and a first electrode of the third transistor is connected with a first power voltage terminal, a second electrode of the third transistor is connected with the output sub-circuit and a first terminal of the first capacitor, a control electrode of the third transistor is connected with the first node and a first terminal of the second capacitor, and a second terminal of the first capacitor and a second terminal of the second capacitor are both connected with the second power voltage terminal.

3. The trigger circuit of claim 2, wherein the control sub-circuit comprises a fourth transistor and a fifth transistor, and a switching characteristic of the fourth transistor and a switching characteristic of the fifth transistor are both opposite to the switching characteristic of the third transistor;

a first electrode of the fourth transistor is connected with the first node, a second electrode of the fourth transistor is connected with a second electrode of the fifth transistor, and a control electrode of the fourth transistor is connected with the signal output terminal of the output sub-circuit; and a first electrode of the fifth transistor is connected with the second power voltage terminal, and a control electrode of the fifth transistor is connected with a data voltage control terminal.

4. The trigger circuit of claim 2, wherein the control sub-circuit comprises a fifth transistor having a switching characteristic opposite to the switching characteristic of the third transistor; and a first electrode of the fifth transistor is connected to the second power voltage terminal, a second electrode of the fifth transistor is connected to the first node, and a control electrode of the fifth transistor is connected to a data voltage control terminal.

5. The trigger circuit of claim 1, the input sub-circuit comprises a first transistor, a first electrode of the first transistor is connected with a first power voltage terminal, a second electrode of the first transistor is connected with the output sub-circuit, and a control electrode of the first transistor is connected with an input control signal terminal, and the reset sub-circuit comprises a second transistor, and a switching characteristic of the second transistor is opposite to a switching characteristic of the first transistor, wherein a first electrode of the second transistor is connected with the first node, and a second electrode of the second transistor is connected with a control electrode of the second transistor and a reset signal terminal, and wherein the duty cycle adjustment sub-circuit comprises a third transistor, a first capacitor, and a second capacitor, a switching characteristic of the third transistor is the same as the switching characteristic of the first transistor, a first electrode of the third transistor is connected with a second power voltage terminal, a second electrode of the third transistor is connected with the output sub-circuit and a first terminal of the first capacitor, a control electrode of the third transistor is connected with the first node and a first terminal of the second capacitor, and a second terminal of the first capacitor and a second terminal of the second capacitor are both connected with the first power voltage terminal.

6. The trigger circuit of claim 5, wherein the control sub-circuit comprises a fourth transistor and a fifth transistor, a switching characteristic of the fourth transistor is the same as the switching characteristic of the third transistor, and a switching characteristic of the fifth transistor is opposite to the switching characteristic of the third transistor;

a first electrode of the fourth transistor is connected with the first node, a second electrode of the fourth transistor is connected with a second electrode of the fifth transistor, and a control electrode of the fourth transistor is connected with the signal output terminal of the output sub-circuit; and a first electrode of the fifth transistor is connected with the first power voltage terminal, and a control electrode of the fifth transistor is connected with a data voltage control terminal.

7. The trigger circuit of claim 5, wherein the control sub-circuit comprises a fifth transistor having a switching characteristic opposite to the switching characteristic of the third transistor; and a first electrode of the fifth transistor is connected to the first power voltage terminal, a second electrode of the fifth transistor is connected to the first node, and a control electrode of the fifth transistor is connected to a data voltage control terminal.

8. The trigger circuit of claim 1, wherein the output sub-circuit comprises a sixth transistor and a seventh transistor, and a switching characteristic of the sixth transistor is opposite to a switching characteristic of the seventh transistor;

a first electrode of the sixth transistor is connected with a first power voltage terminal, a second electrode of the sixth transistor is connected with the signal output terminal of the output sub-circuit, and a control electrode of the sixth transistor is connected with a control electrode of the seventh transistor, the input sub-circuit and the duty cycle adjustment sub-circuit; and a first electrode of the seventh transistor is connected with a second power voltage terminal, and a second electrode of the seventh transistor is connected with the signal output terminal of the output sub-circuit.

9. A pixel driving circuit, comprising a driving transistor and a trigger circuit, wherein a signal output terminal of the trigger circuit is connected with a control electrode of the driving transistor, and the trigger circuit comprises the trigger circuit of claim 1.

10. A trigger circuit, comprising: an input sub-circuit, a reset sub-circuit, a control sub-circuit and a duty cycle adjustment sub-circuit, wherein the input sub-circuit is configured to control a signal output terminal to output a first power voltage or output a second power voltage in response to an input control signal, and the signal output terminal is a connection node between the input sub-circuit and the duty cycle adjustment sub-circuit;

the reset sub-circuit is configured to reset, in response to a reset signal, a first node through the reset signal, and the first node is a connection node between the control sub-circuit and the duty cycle adjustment sub-circuit;

the control sub-circuit is configured to control a potential at the first node in response to a data voltage control signal, an output signal of the signal output terminal, and the reset signal; and the duty cycle adjustment sub-circuit is configured to adjust a duty cycle of a clock signal output from the signal output terminal in response to the potential at the first node, and a potential of the clock signal jumps between the first power voltage and the second power voltage, and wherein the input sub-circuit comprises a first transistor, a first electrode of the first transistor is connected with a second power voltage terminal, a second electrode of the first transistor is connected with the signal output terminal, and a control electrode of the first transistor is connected with an input control signal terminal; the reset sub-circuit comprises a second transistor, and a switching characteristic of the second transistor is opposite to a switching characteristic of the first transistor, wherein a first electrode of the second transistor is connected with the first node, and a second electrode of the second transistor is connected with a control electrode of the second transistor and a reset signal terminal, or the input sub-circuit comprises a first transistor, a first electrode of the first transistor is connected with a first power voltage terminal, a second electrode of the first transistor is connected with the signal output terminal, and a control electrode of the first transistor is connected with an input control signal terminal; the reset sub-circuit comprises a second transistor, and a switching characteristic of the second transistor is opposite to a switching characteristic of the first transistor; and wherein a first electrode of the second transistor is connected with the first node, and a second electrode of the second transistor is connected with a control electrode of the second transistor and a reset signal terminal.

11. The trigger circuit of claim 10, wherein the input sub-circuit comprises a first transistor, a first electrode of the first transistor is connected with a second power voltage terminal, a second electrode of the first transistor is connected with the signal output terminal, and a control electrode of the first transistor is connected with an input control signal terminal; the reset sub-circuit comprises a second transistor, and a switching characteristic of the second transistor is opposite to a switching characteristic of the first transistor, wherein a first electrode of the second transistor is connected with the first node, and a second electrode of the second transistor is connected with a control electrode of the second transistor and a reset signal terminal, and wherein the duty cycle adjustment sub-circuit comprises a third transistor, a first capacitor, and a second capacitor, a switching characteristic of the third transistor is the same as a switching characteristic of the first transistor, a first electrode of the third transistor is connected with a first power voltage terminal, a second electrode of the third transistor is connected with the signal output terminal and a first terminal of the first capacitor, a control electrode of the third transistor is connected with the first node and a first terminal of the second capacitor, and a second terminal of the first capacitor and a second terminal of the second capacitor are both connected with a second power voltage terminal.

12. The trigger circuit of claim 11, wherein the control sub-circuit comprises a fourth transistor, a fifth transistor, and a sixth transistor, a switching characteristic of the fourth transistor is the same as the switching characteristic of the third transistor, and a switching characteristic of the fifth transistor and a switching characteristic of the sixth transistor are both opposite to the switching characteristic of the third transistor;

a first electrode of the fourth transistor is connected with a second electrode of the fifth transistor and a first electrode of the sixth transistor, a second electrode of the fourth transistor is connected with the first node, and a control electrode of the fourth transistor is connected with a reset signal terminal;

a first electrode of the fifth transistor is connected with a second electrode of the sixth transistor and the second power voltage terminal, and a control electrode of the fifth transistor is connected with a data voltage control terminal; and a control electrode of the sixth transistor is connected with the signal output terminal.

13. The trigger circuit of claim 10, wherein the input sub-circuit comprises a first transistor, a first electrode of the first transistor is connected with a first power voltage terminal, a second electrode of the first transistor is connected with the signal output terminal, and a control electrode of the first transistor is connected with an input control signal terminal; the reset sub-circuit comprises a second transistor, and a switching characteristic of the second transistor is opposite to a switching characteristic of the first transistor; and wherein a first electrode of the second transistor is connected with the first node, and a second electrode of the second transistor is connected with a control electrode of the second transistor and a reset signal terminal, and wherein the duty cycle adjustment sub-circuit comprises a third transistor, a first capacitor, and a second capacitor, a switching characteristic of the third transistor is the same as a switching characteristic of the first transistor, a first electrode of the third transistor is connected with a second power voltage terminal, a second electrode of the third transistor is connected with the signal output terminal and a first terminal of the first capacitor, a control electrode of the third transistor is connected with the first node and a first terminal of the second capacitor, and a second terminal of the first capacitor and a second terminal of the second capacitor are both connected with the first power voltage terminal.

14. The trigger circuit of claim 13, wherein the control sub-circuit comprises a fourth transistor, a fifth transistor, and a sixth transistor, a switching characteristic of the fourth transistor is the same as the switching characteristic of the third transistor, and a switching characteristic of the fifth transistor and a switching characteristic of the sixth transistor are both opposite to the switching characteristic of the third transistor;

a first electrode of the fourth transistor is connected with a second electrode of the fifth transistor and a first electrode of the sixth transistor, a second electrode of the fourth transistor is connected with the first node, and a control electrode of the fourth transistor is connected with a reset signal terminal;

a first electrode of the fifth transistor is connected with a second electrode of the sixth transistor and the first power voltage terminal, and a control electrode of the fifth transistor is connected with a data voltage control terminal; and a control electrode of the sixth transistor is connected with the signal output terminal.

* * * * *